W. P. DUN LANY.
INSERTING, FOLDING, AND WRAPPING MACHINE.
APPLICATION FILED MAY 25, 1918.
1,407,646.
Patented Feb. 21, 1922.
18 SHEETS—SHEET 1.
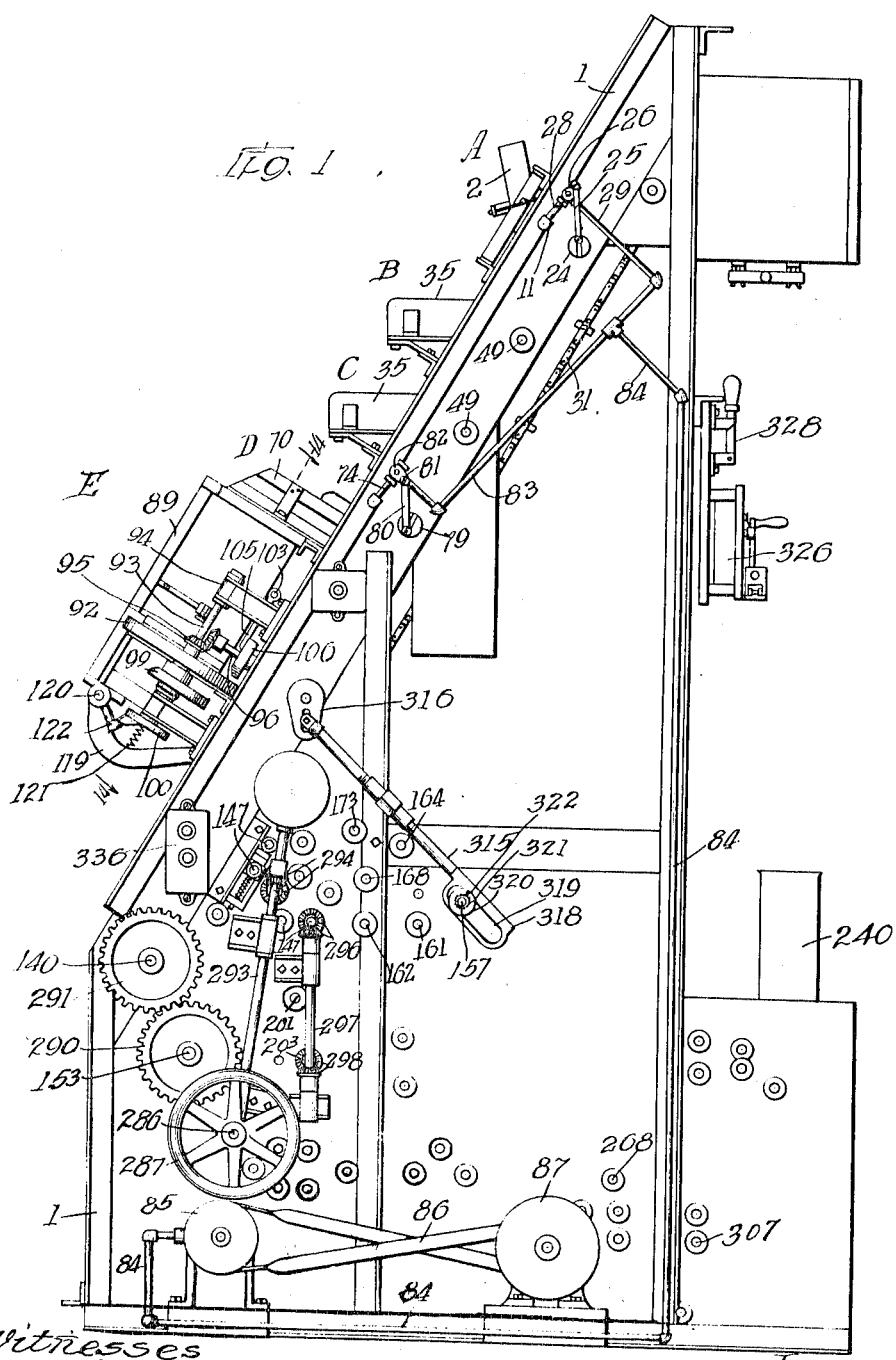

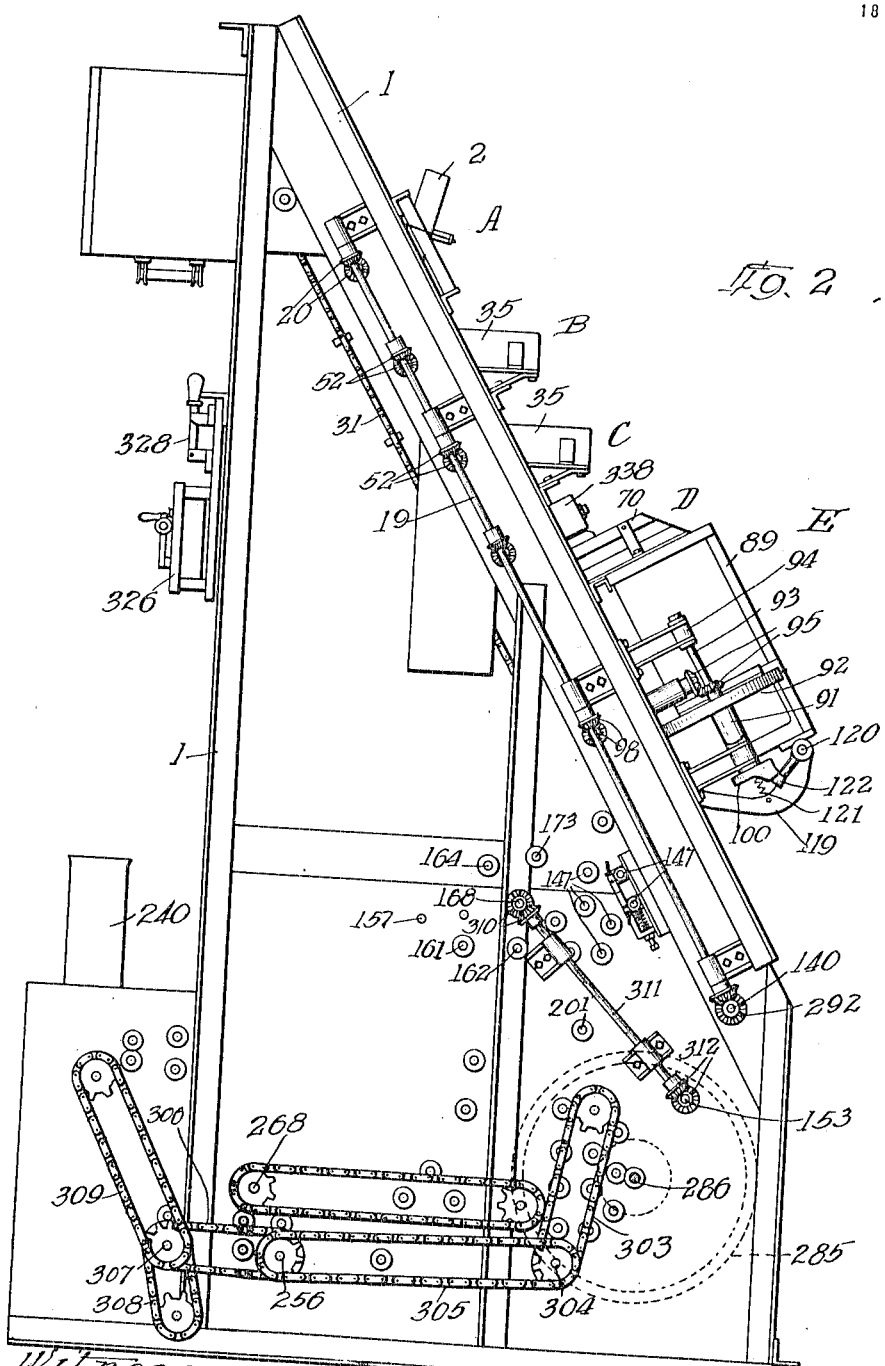

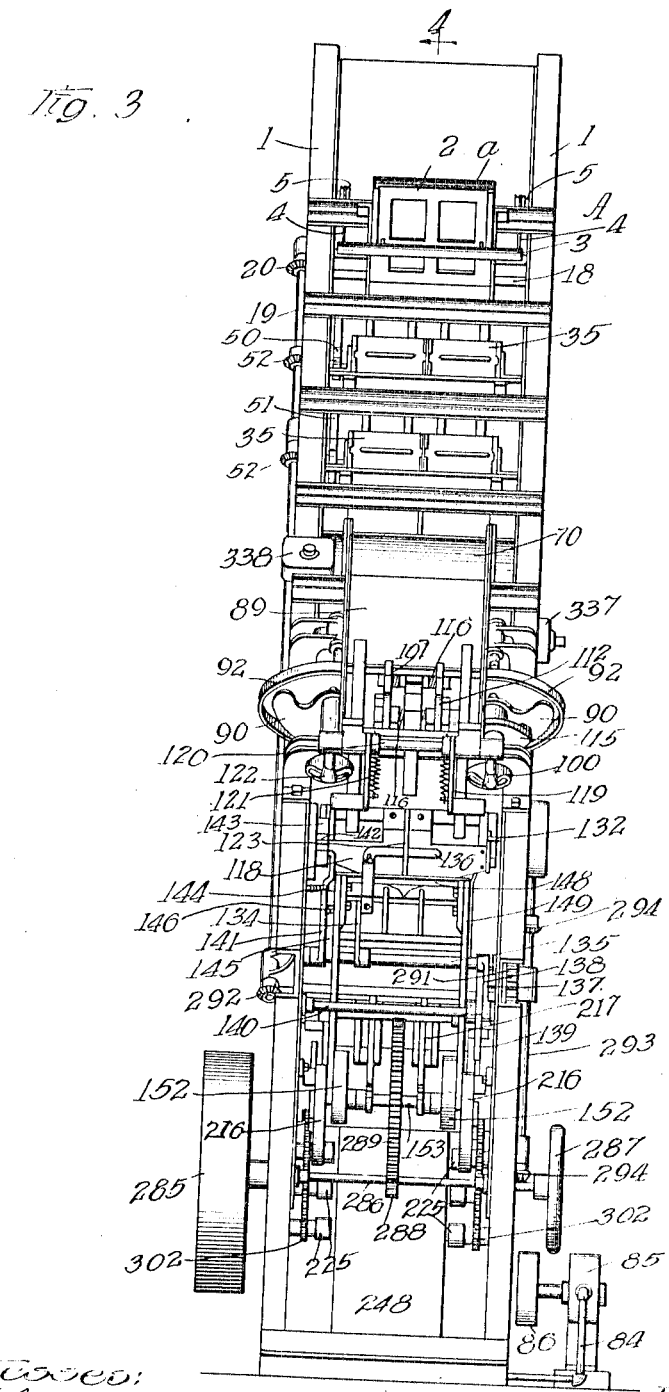

W. P. DUN LANY.
INSERTING, FOLDING, AND WRAPPING MACHINE.
APPLICATION FILED MAY 25, 1918.
1,407,646.
Patented Feb. 21, 1922.
18 SHEETS—SHEET 4.
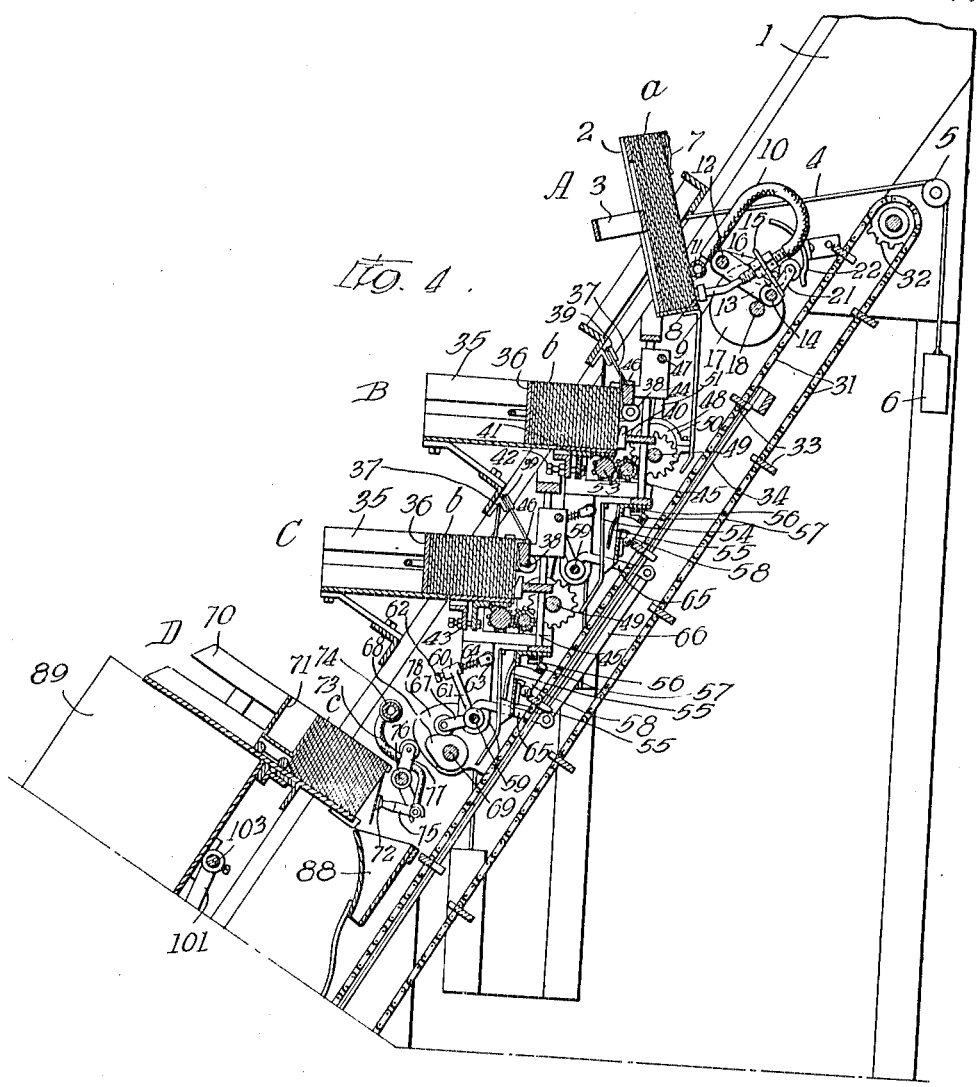
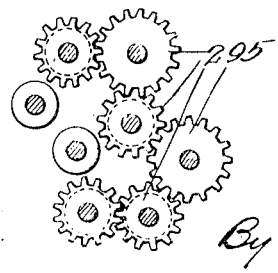

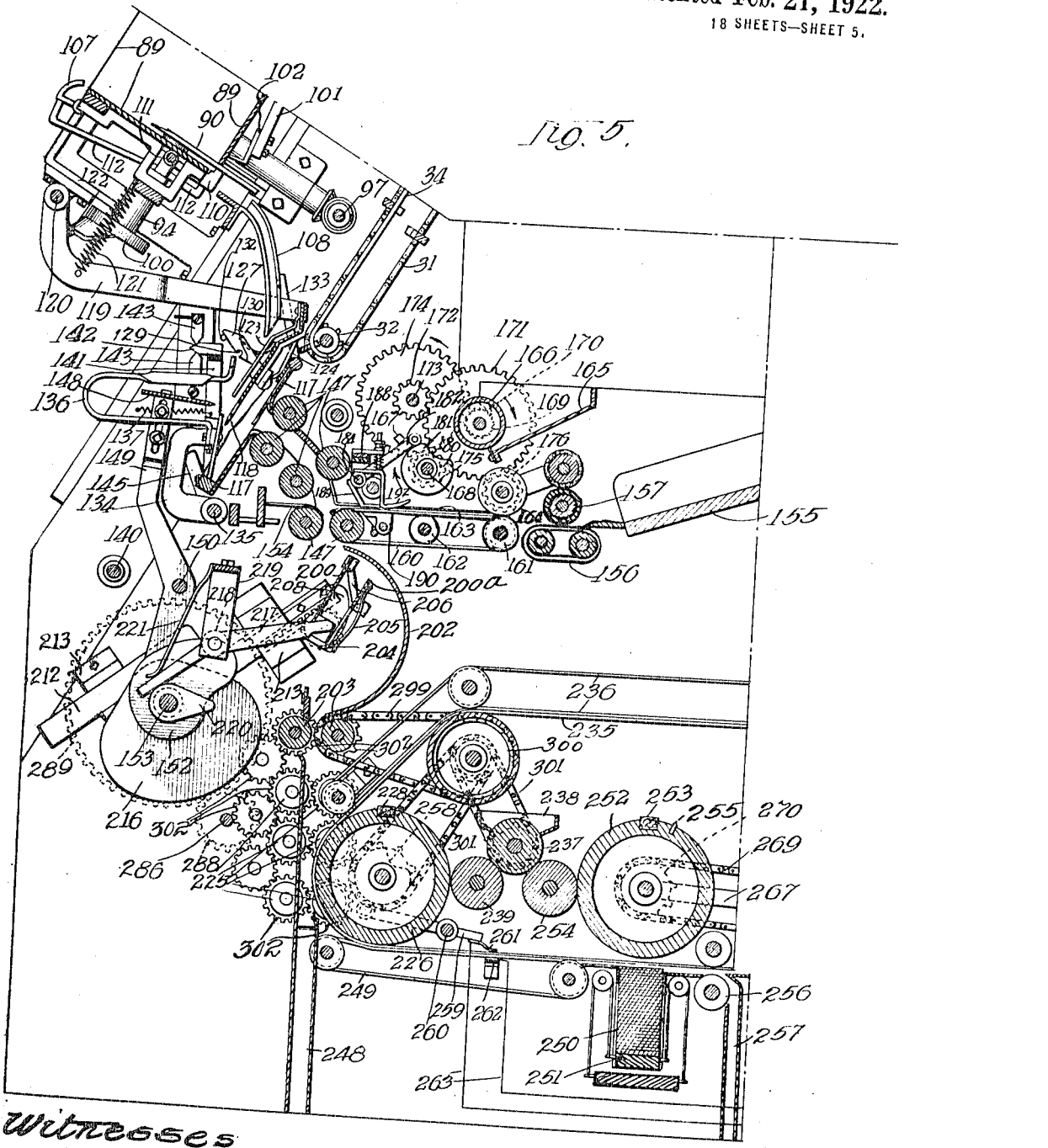

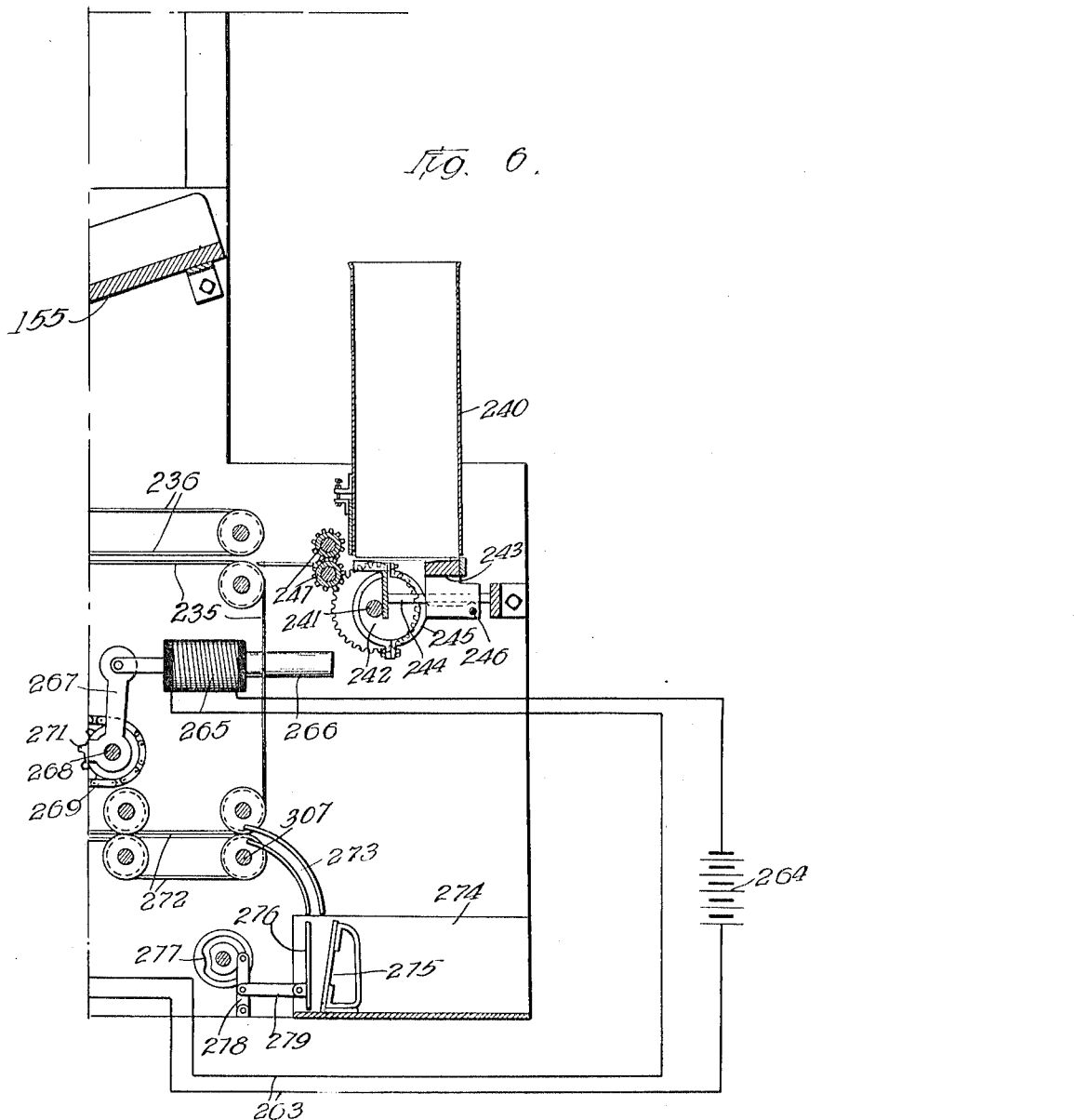

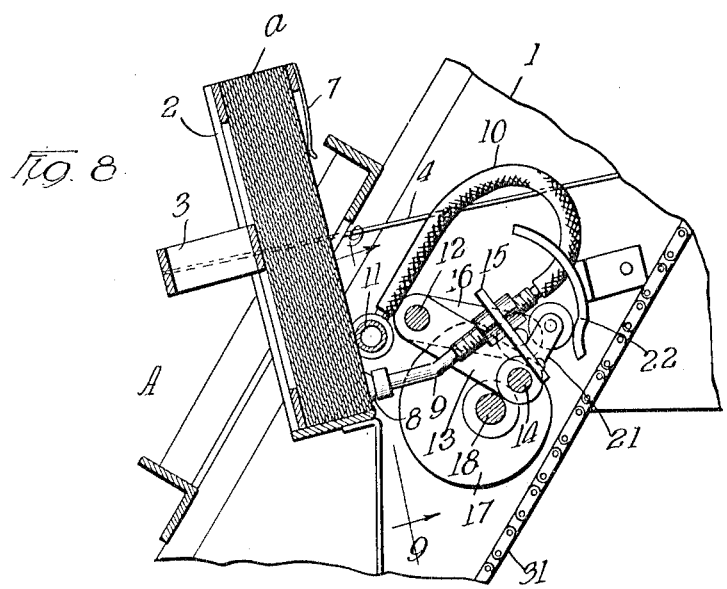
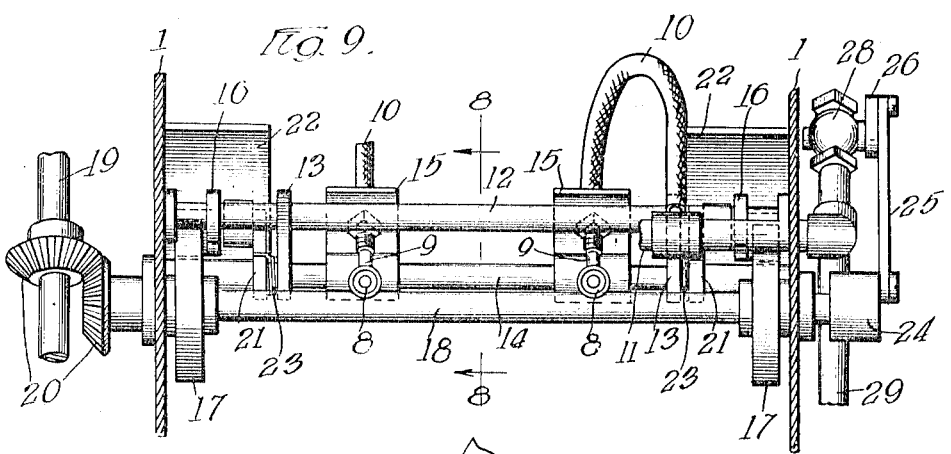
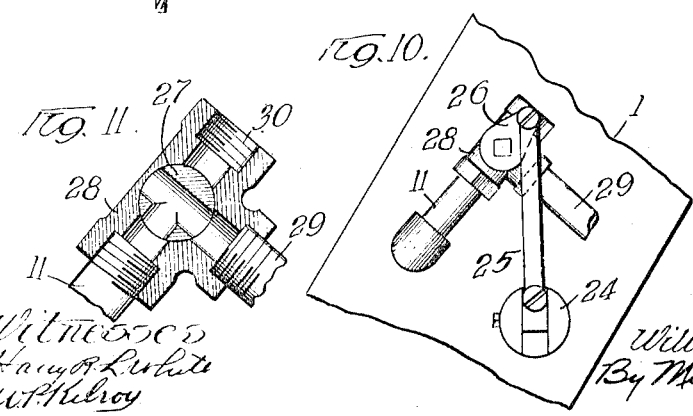

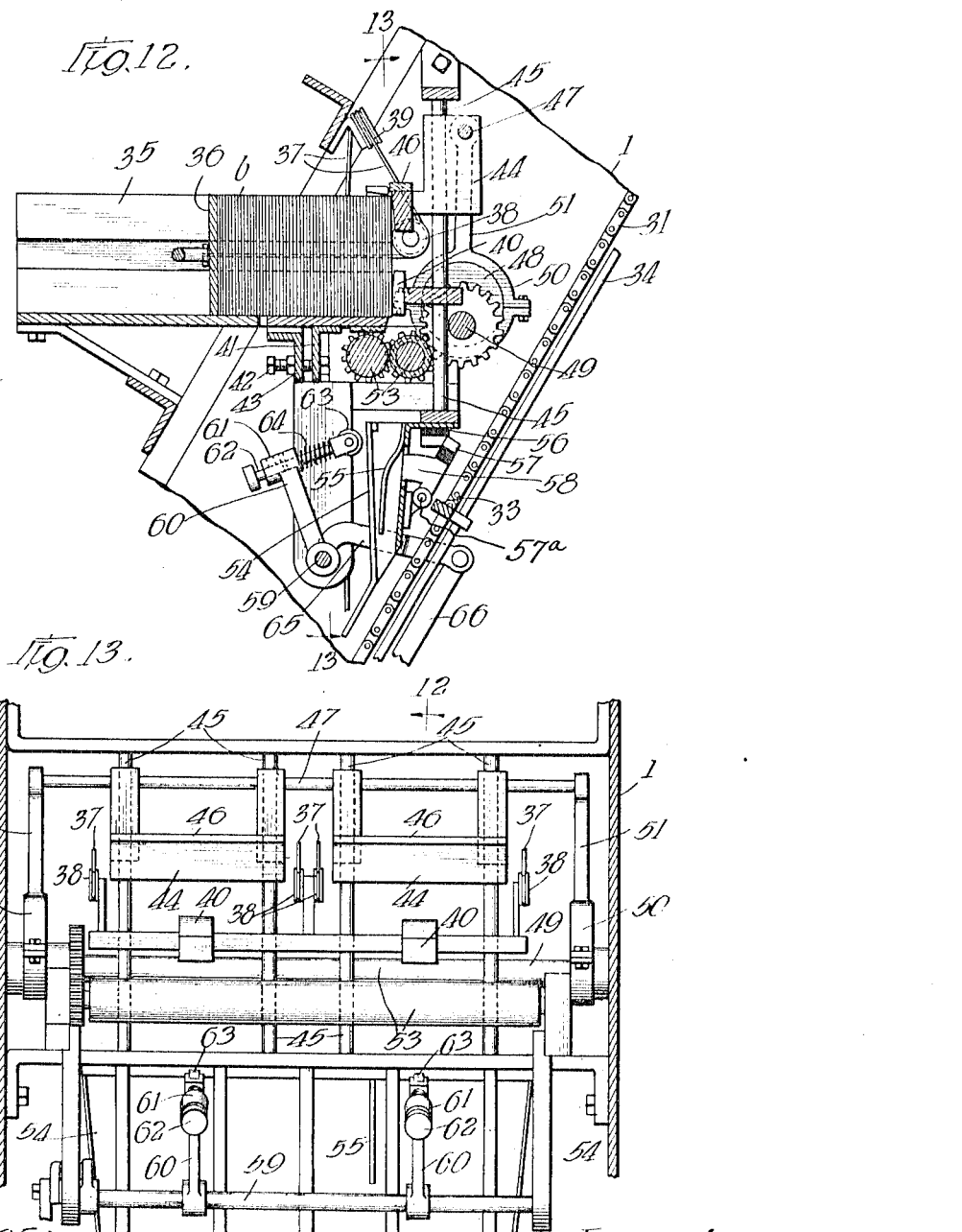

W. P. DUN LANY.
INSERTING, FOLDING, AND WRAPPING MACHINE.
APPLICATION FILED MAY 25, 1918.
1,407,646.
Patented Feb. 21, 1922.
18 SHEETS—SHEET 9.
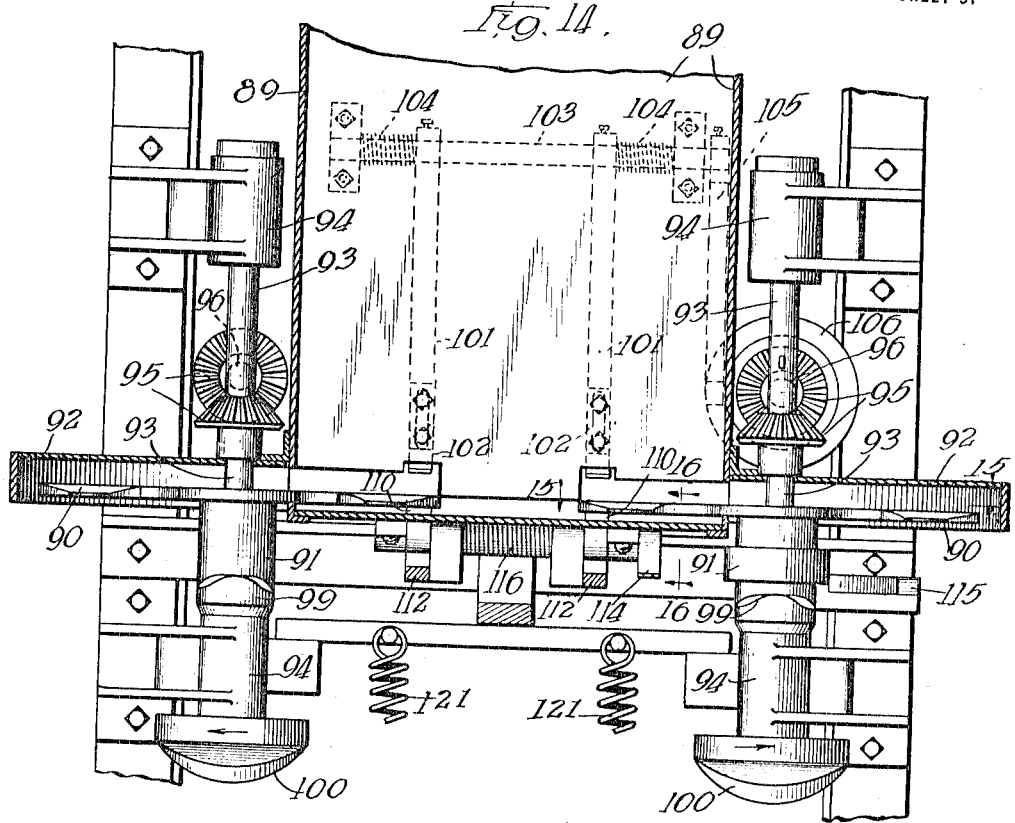
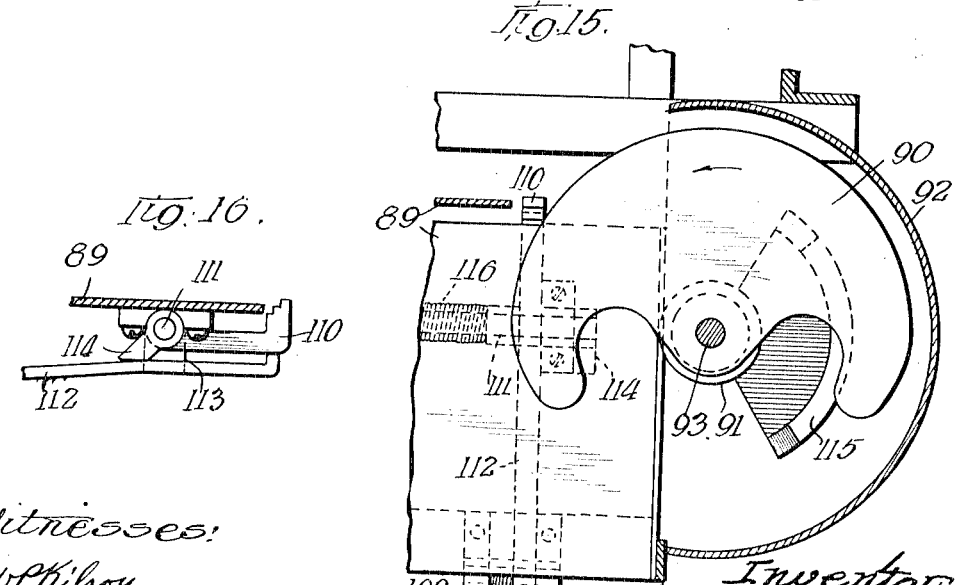

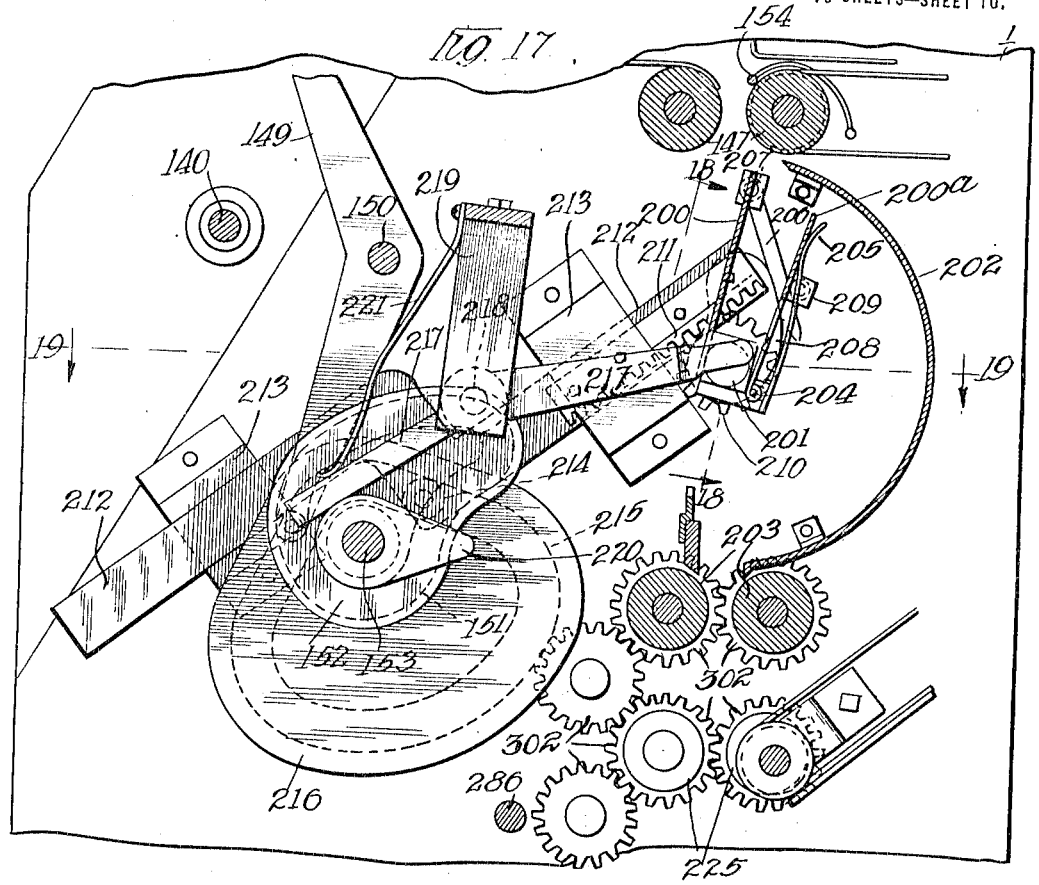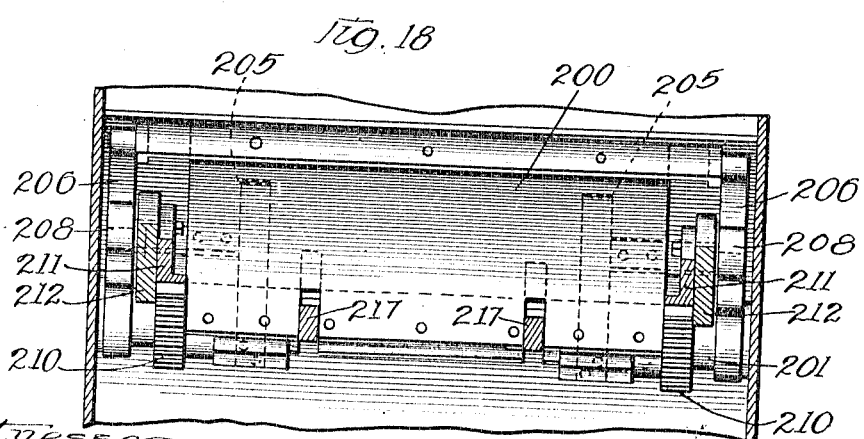

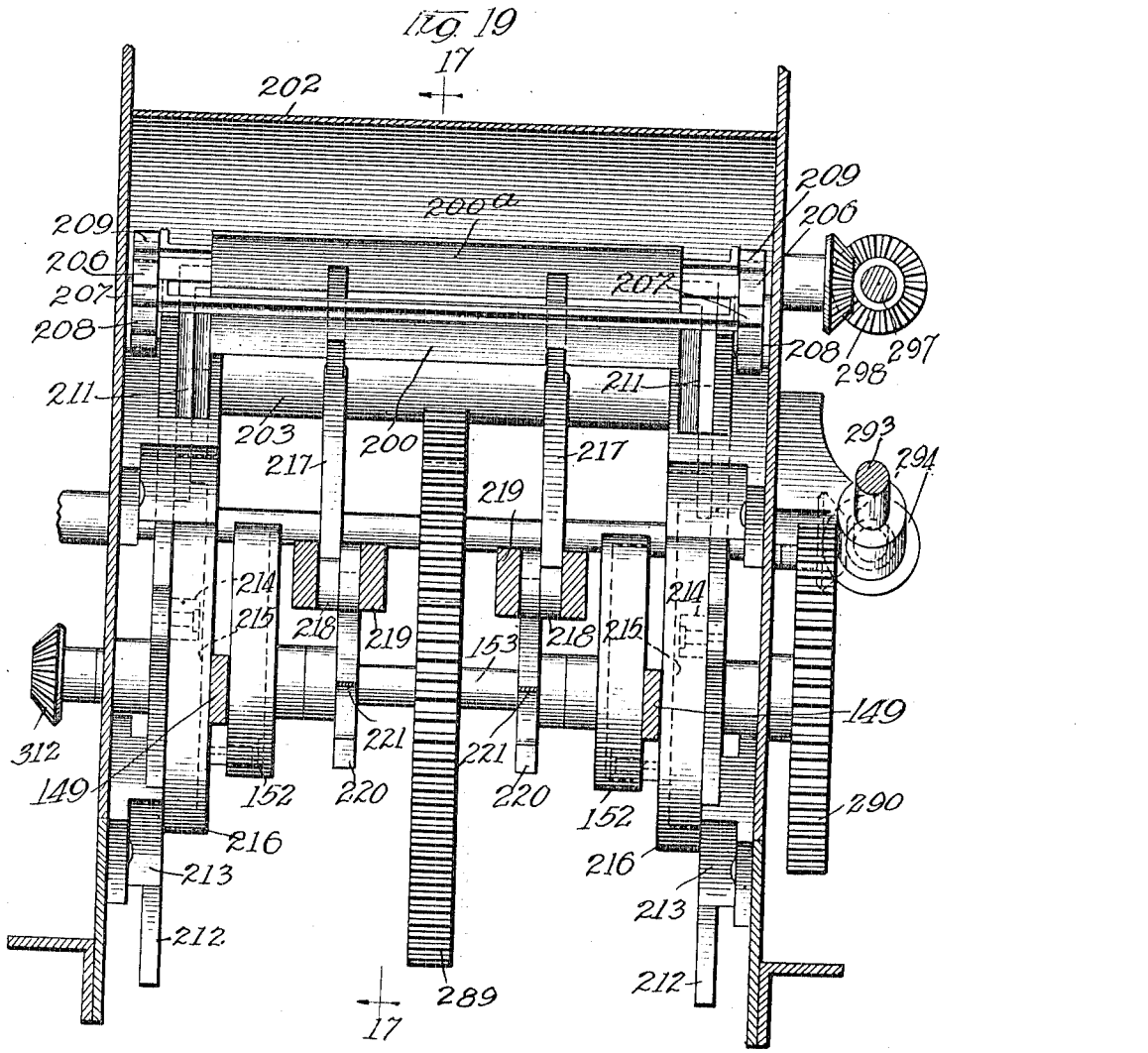

W. P. DUN LANY.
INSERTING, FOLDING, AND WRAPPING MACHINE.
APPLICATION FILED MAY 25, 1918.
1,407,646.
Patented Feb. 21, 1922.
18 SHEETS—SHEET 12.
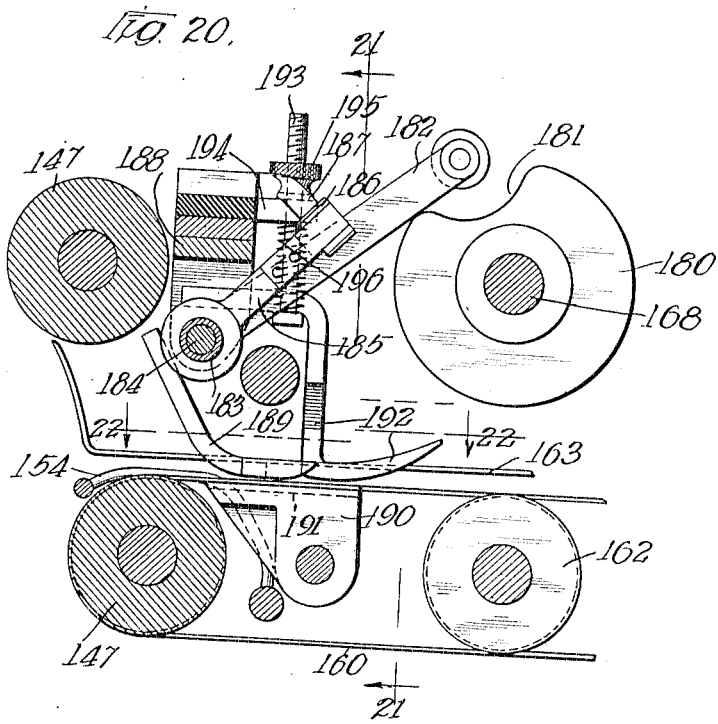
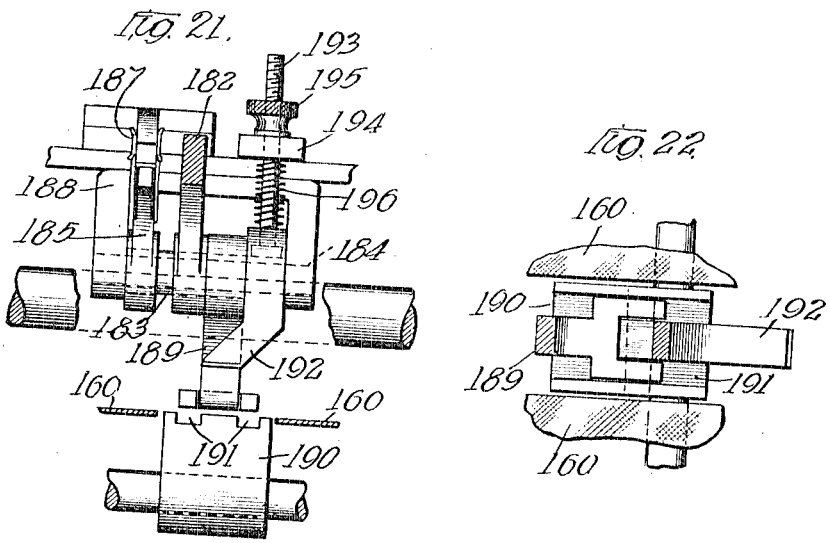
Witnesses:
W. T. Kilroy
Harry W. E. White
Inventor:
William P. Dun Lany.
By Miller, Chindahl & Parker
Attys.

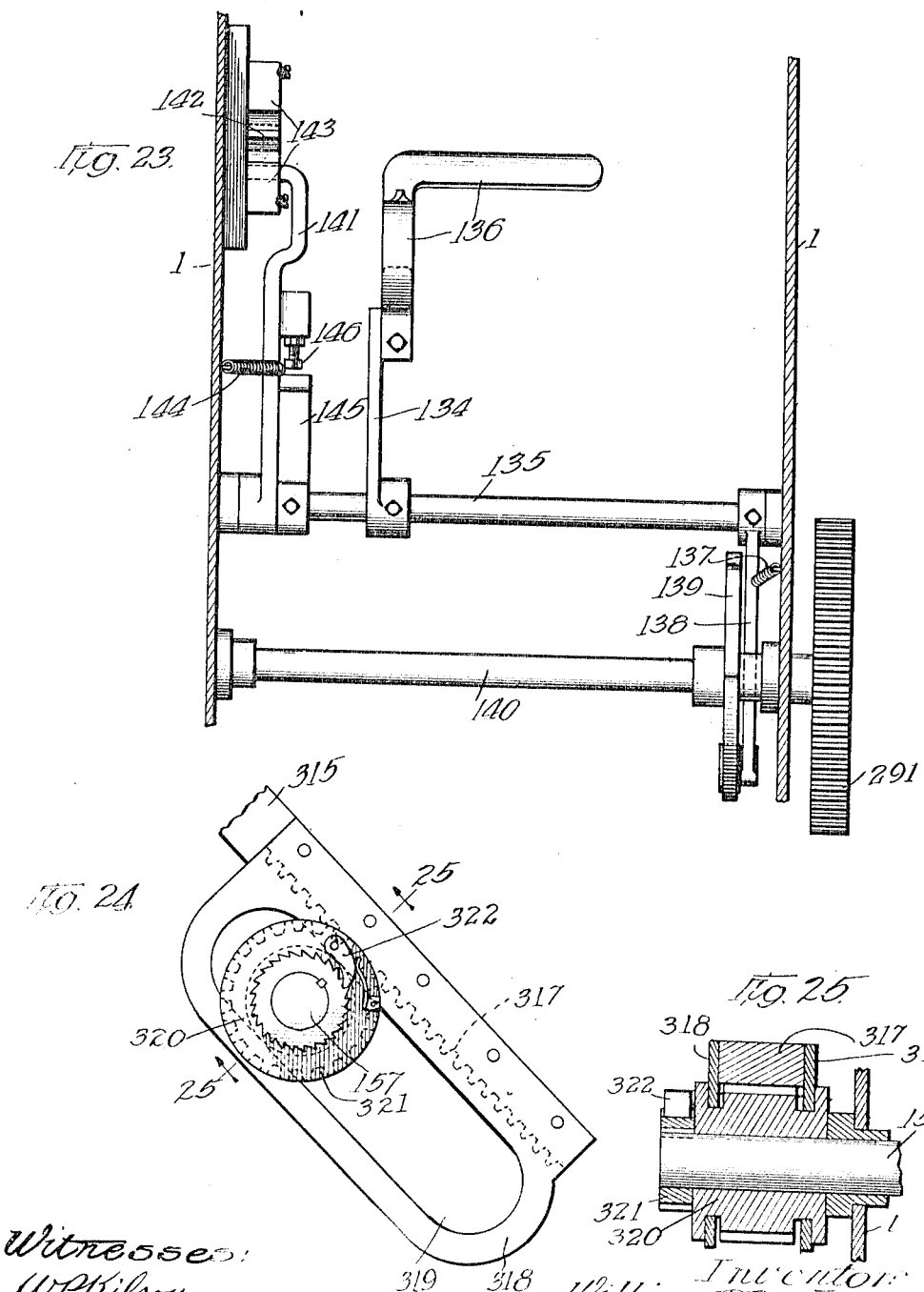

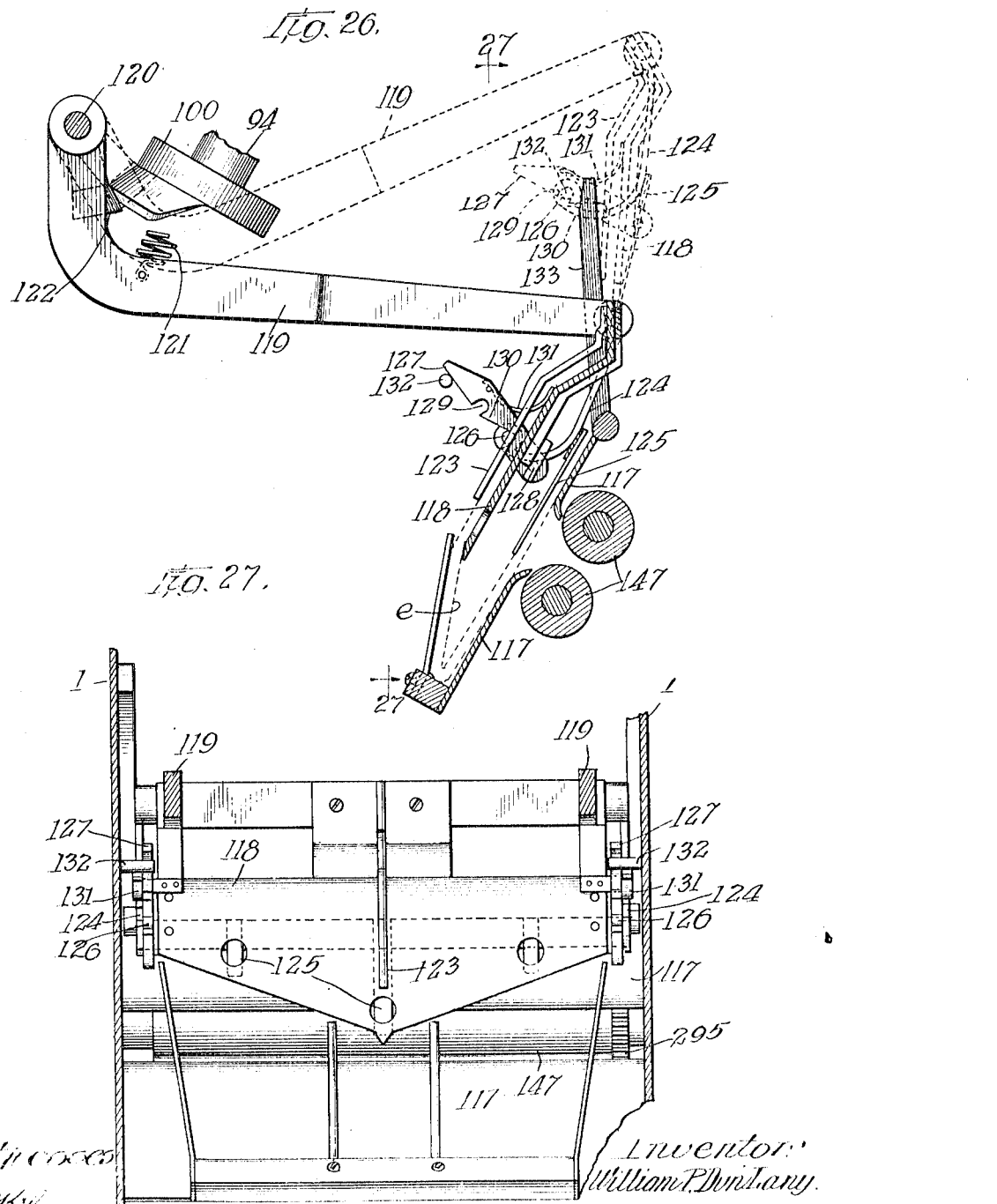

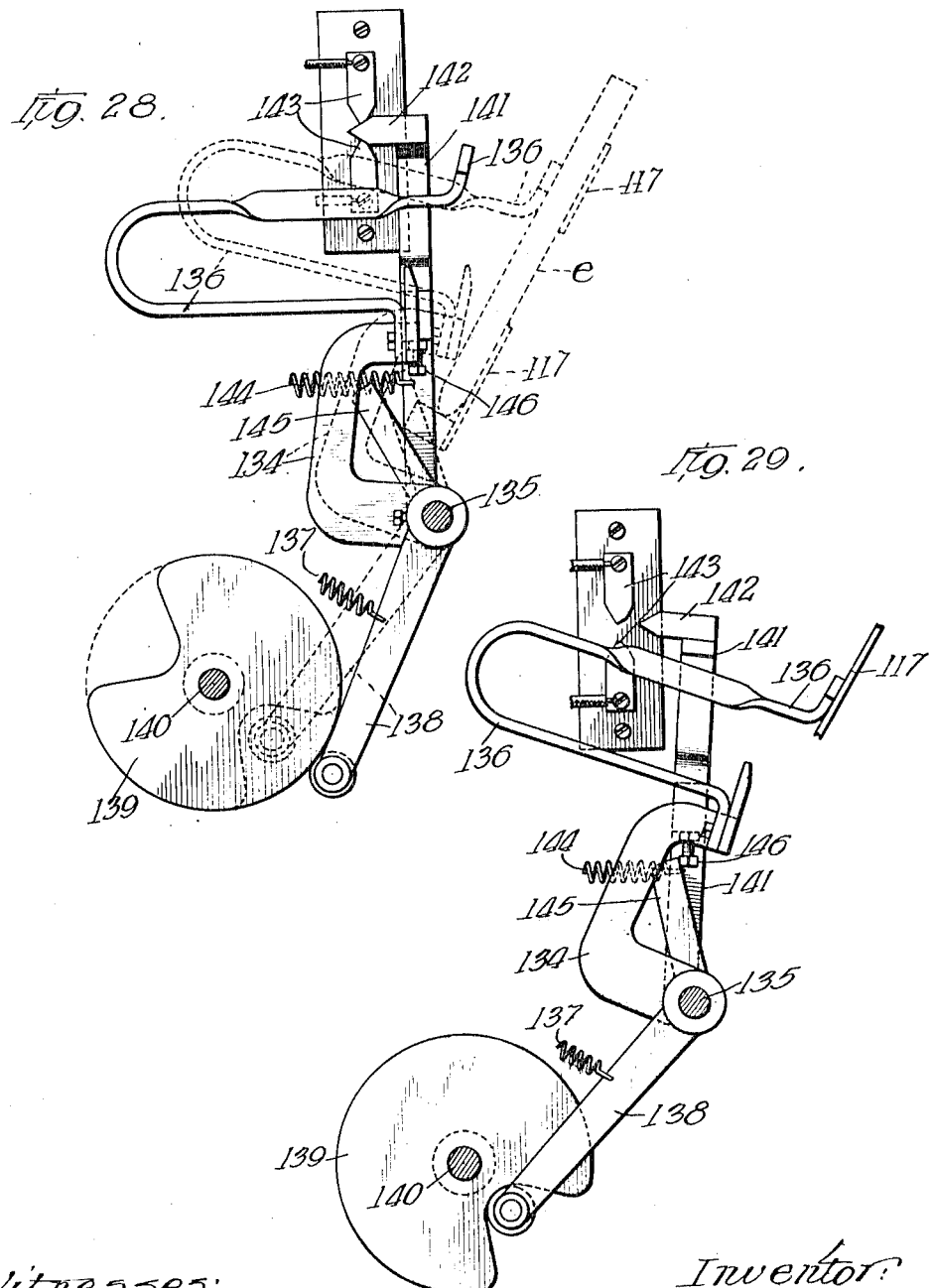

W. P. DUN LANY.
INSERTING, FOLDING, AND WRAPPING MACHINE.
APPLICATION FILED MAY 25, 1918.
1,407,646.
Patented Feb. 21, 1922.
18 SHEETS—SHEET 16.
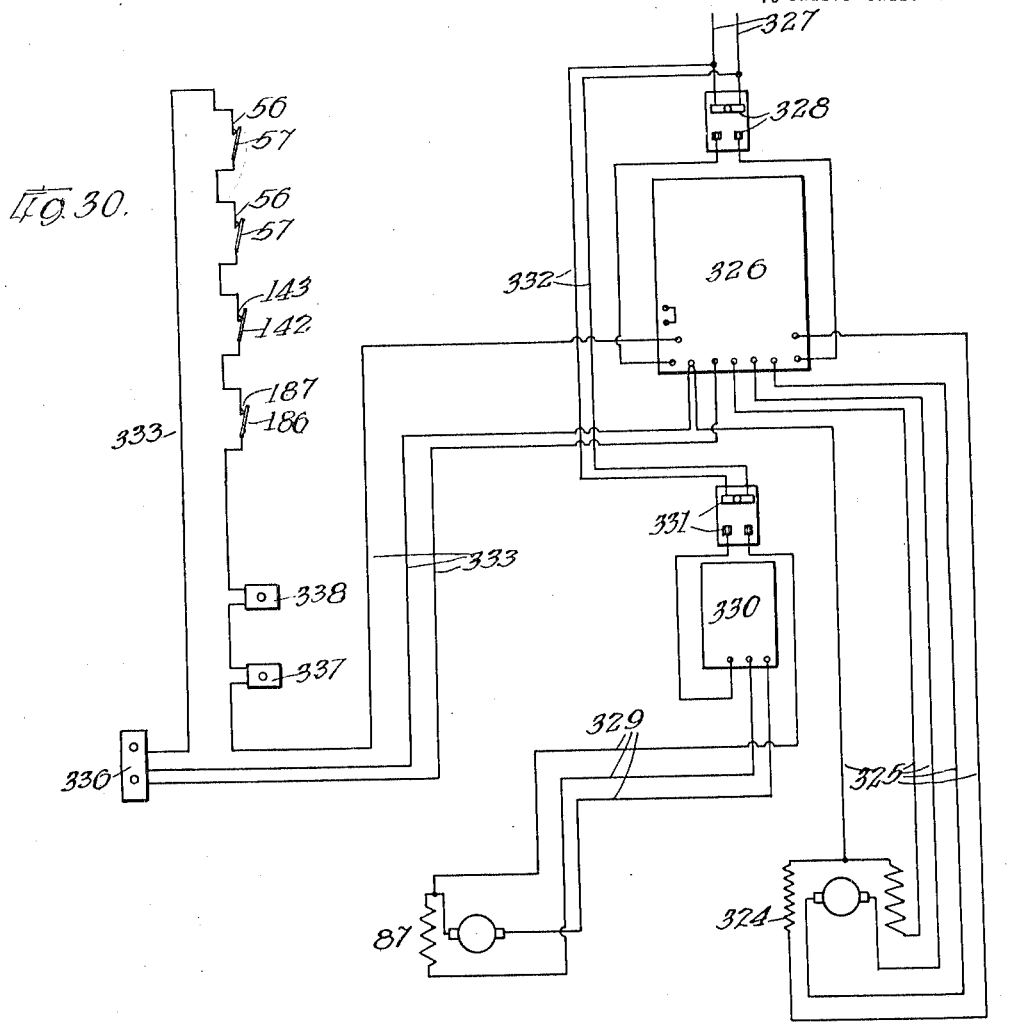
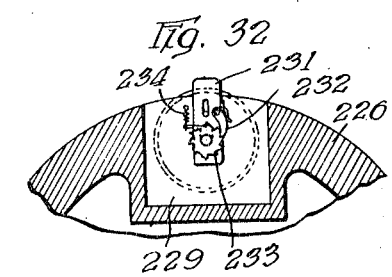
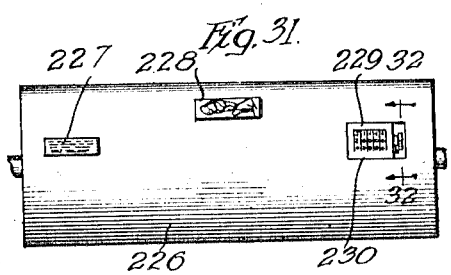
Witnesses
W. T. Kilroy
Harry C. White
Inventor
William P. DunLany.
By Miller, Chindahl & Parker
Attys

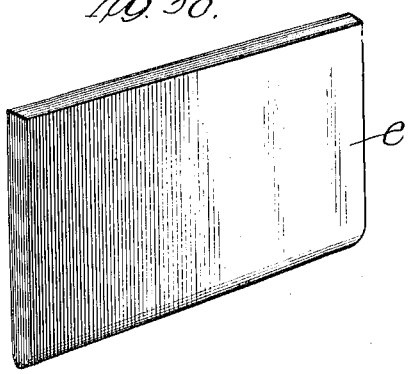
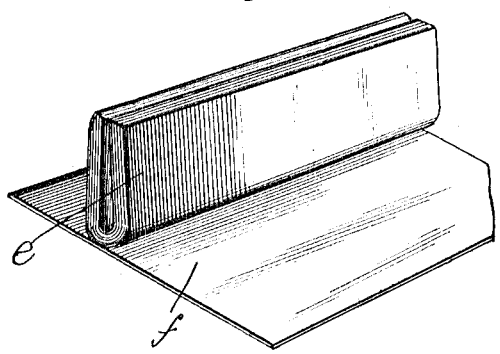
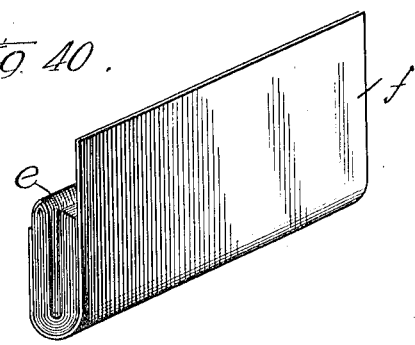
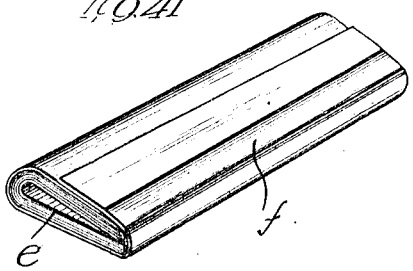
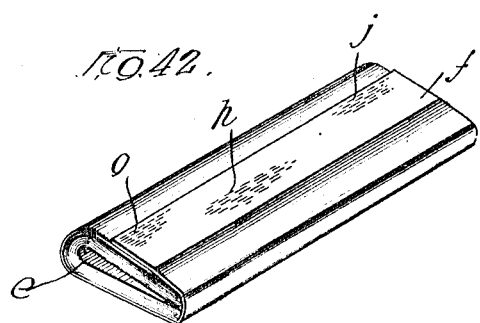

UNITED STATES PATENT OFFICE.

WILLIAM P. DUN LANY, OF CHICAGO, ILLINOIS, ASSIGNOR TO SEARS, ROEBUCK AND CO., OF CHICAGO, ILLINOIS, A CORPORATION OF NEW YORK.

INSERTING, FOLDING, AND WRAPPING MACHINE.

1,407,646.

Specification of Letters Patent.   Patented Feb. 21, 1922.

Application filed May 25, 1918. Serial No. 236,499.

*To all whom it may concern:*

Be it known that I, WILLIAM P. DUN LANY, a citizen of the United States, residing at Chicago, in the county of Cook and State of Illinois, have invented certain new and useful Improvements in Inserting, Folding, and Wrapping Machines, of which the following is a specification.

In sending out catalogs, it is customary with some firms to place in each catalog one or more inserts for the convenience of the customer, as, for example, order blanks, postcards, addressed envelopes, and like articles, and heretofore the placing of these articles in each catalog has been done by hand.

It is the general object of this invention to produce a machine by which such articles may be placed in catalogs automatically, and the invention contemplates a machine which is arranged to automatically withdraw an article from each of a plurality of magazines; to collect all the articles in separate groups, each group containing one or any desired number of each kind; to feed catalogs singly and successively from a stack; to open each catalog; to deposit an article or a group of articles therein; to fold the catalog, to place a wrapper about the folded catalog, and to stamp and address the wrapper ready for the catalog to be mailed.

Some of the special objects of my invention are to provide a special conveyor particularly adapted to receive, convey and deliver in assembled groups, articles of different kinds and sizes; and also to devise novel means for opening books or similar articles which have been completely assembled and stored prior to their use in my improved device so that there is no tendency for the book to fall open and ordinary suction devices are inadequate.

Many other special objects and advantages of my improved device will become apparent as the description proceeds.

In the accompanying drawings, which show one of many possible embodiments of my invention, Figures 1 and 2 are side elevations looking at opposite sides of the machine.

Fig. 3 is a front elevation.

Figs. 4, 5 and 6, taken together, constitute a vertical central section from front to rear through the machine taken in the plane of line 4—4 of Fig. 3.

Fig. 7 (Sheet 4) is a detail view of a train of gears for driving the catalog-folding rolls.

Fig. 8 is an enlarged sectional view in the plane of line 8—8 of Fig. 9, illustrating the magazine for the order blanks and the means for feeding said blanks to the assembling conveyor.

Fig. 9 is a front elevation of the feed means seen in Fig. 8, the view being taken in the plane of line 9—9 of Fig. 8.

Fig. 10 is an elevation, looking at the right end of Fig. 9.

Fig. 11 is a sectional detail view of a valve shown in Fig. 10.

Fig. 12 is an enlarged sectional view in the plane of line 12—12 of Fig. 13, showing one of the two magazines and feeding means for postcard inserts.

Fig. 13 is a view in the nature of a front elevation, looking in the plane of line 13—13 of Fig. 12, and showing the feeding means for the postcards.

Fig. 14 is a sectional view of the catalog magazine and feeding means, the section being taken in about the plane of line 14—14 of Fig. 1.

Figs. 15 and 16 are sections in the planes of lines 15—15 and 16—16 of Fig. 14.

Fig. 17 is an enlarged vertical sectional view taken in about the same plane as Fig. 5 and illustrating the catalog folding and wrapping means. The exact plane of the section is indicated by line 17—17 of Fig. 19.

Figs. 18 and 19 are sectional views taken in the planes of lines 18—18 and 19—19 respectively of Fig. 17.

Fig. 20 is an enlarged vertical section in about the same plane as Fig. 5 illustrating the means for detecting the absence of a wrapper for the catalog and for automatically stopping the machine if a wrapper is not in position.

Figs. 21 and 22 are sections on lines 21—21 and 22—22 respectively of Fig. 20.

Fig. 23 is a sectional view showing the catalog-detector means in front elevation.

Fig. 24 is an enlarged side elevation of a rack and gear device for intermittently actuating the wrapper feeding means.

Fig. 25 is a section on line 25—25 of Fig. 24.

Fig. 26 is an enlarged vertical section in about the plane of Fig. 5, illustrating the means for opening a catalog to admit articles thereinto.

Fig. 27 is a front view in the plane of line 27—27 of Fig. 26.

Figs. 28 and 29 are detailed views showing in two different positions the means for detecting the absence of a catalog and for stopping the machine if no catalog is present in the position to receive articles.

Fig. 30 is a diagrammatic view illustrating the electrical driving, controlling, and operating mechanism.

Fig. 31 is an elevation of the printing cylinder for printing the address, return card and prepayment postage stamp on the wrapper on the catalog.

Fig. 32 is a section in the plane of line 32—32 of Fig. 31.

Figs. 33 to 42 inclusive are diagrammatic views in a series showing the progressive steps of the operations on the inserts, catalog and wrapper.

*Brief description of whole machine.*

Before proceeding with a detailed description of the mechanism of the machine, I will now outline the nature of the work to be done by the machine, and the structure and functions of the principal elements, so that the later detailed description may be more clearly understood.

Figure 33:
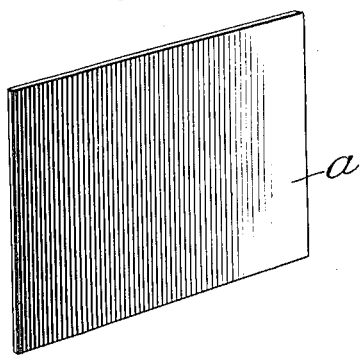
Figure 34:
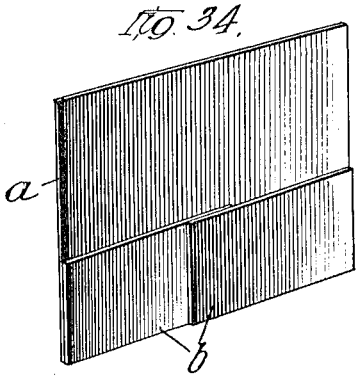
Figure 35:
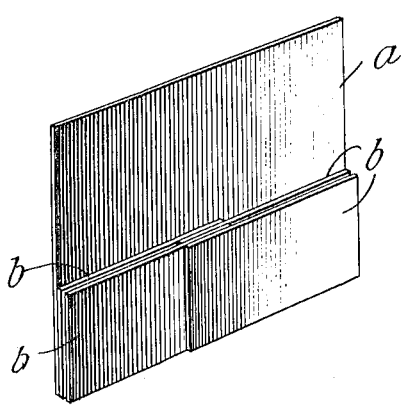
Figure 36:
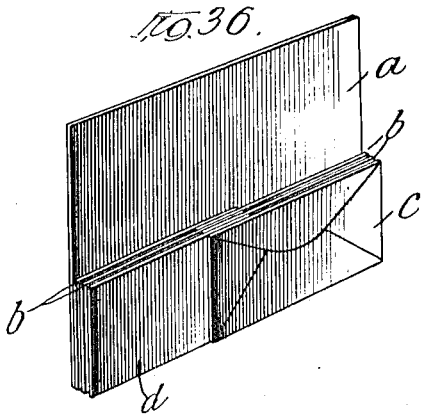
Figure 37:
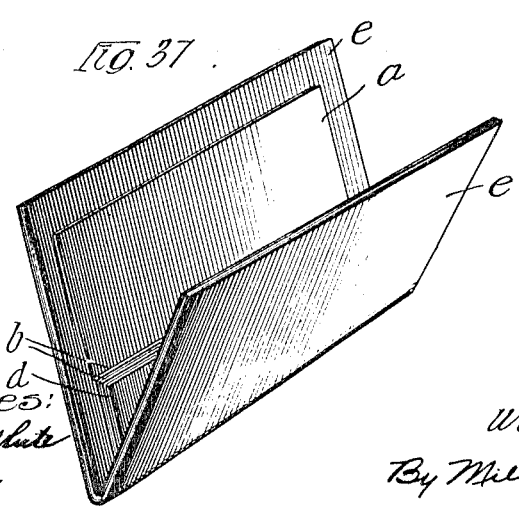

The nature of the work or operations performed by the present machine will best be understood by an examination of the development series of views in Figs. 33 to 42 inclusive of the drawings. The machine is arranged to select first an insert $a$, as for example an order blank (see Fig. 33). This is carried to the next insert station where two other articles such as postcards $b$ are associated therewith (see Fig. 34). At the next station two more articles, as for example additional postcards $b$, are added to the group (Fig. 35) and at the fourth station, which is the last insert station in the present machine, an envelope $c$ and another insert which may be a change-of-address blank or order slip $d$, are added to the group. Fig. 36 represents a complete group of articles as they are selected by the present machine. In Fig. 37 is shown an open catalog $e$ in which the group of articles shown in Fig. 36 have been placed. While for convenience in illustrating the same, the wrapper or book has been illustrated as a single section or brochure, my invention is not limited to the use of a single section but is especially adapted to operate not only on single sections but also on large bound books of considerable thickness. Fig. 38 represents the catalog closed upon the articles. Fig. 39 represents the catalog with the articles therein folded in half and resting on a wrapper $f$. In the next operation of the machine the wrapper is partially folded by the catalog as seen in Fig. 40 and the remaining flap of the wrapper which has previously been supplied with paste is then folded over as seen in Fig. 41 to complete the wrapping operation. Fig. 42 represents the folded and wrapped catalog addressed and stamped, the address of the sender being designated $g$ and the address of the addressee being designated $h$. $j$ indicates a printed stamp for showing prepayment of postage for the package.

The nature of the mechanisms for performing these operations will now be briefly explained and will be best understood by reference to Figs. 1 to 5 inclusive. At the top of the machine are a plurality of stations (in this instance four) designated A, B, C and D. At each station there is a magazine, or magazines, containing inserts of any character desired and there is also means for automatically feeding or withdrawing these articles or inserts singly and successively from the magazine and depositing them upon a conveyor beneath. These stations and the conveyor are arranged at the front of the machine and extend in an inclined plane. The conveyor is divided into sections, each of which is arranged to receive an insert from station A, then to pass on and receive articles or inserts successively from stations B, C and D, so that each conveyor section will at the proper time deliver a compact group of articles into an open catalog. The catalog magazine and feeding means as a whole is designated E, and the feeding means is arranged to singly and successively withdraw the lowermost catalogs from the pile in the magazine. After such withdrawal, each catalog descends by gravity into a box, the catalog standing in an inclined upright position with the open edge of the catalog uppermost and adjacent to the lower end of the insert-collecting conveyor. The catalog is then opened by automatic means in time to receive the group of articles discharged by the conveyor, after which the catalog is closed and is given a single fold along a horizontal median line by means of a knife and co-operating rollers. These rollers deliver the folded catalog upon a horizontally positioned wrapper and then force the catalog and the wrapper into an oscillatory box which in connection with an arcuate or circumferential plate and another pair of rolls acts to fold the final flap of the wrapper about the catalog. Prior to the engagement of the catalog with the wrapper, a suitable quantity of adhesive has been automatically applied to the wrapper so that when the final flap is folded over, it adheres to the adjacent portion of the wrapper. A printing mechanism now acts upon the wrapped catalog to print the name and address of a customer, the return card of the sender, and a stamp indicating that postage has been prepaid for the package.

With this preliminary description of the general construction and functions of the machine, I will now proceed to a more detailed description.

In the exemplary embodiment herein shown, the main frame of the machine comprises two side frames 1 the forward edges of which are inclined for the greater portion thereof. The two frames are suitably joined by cross-pieces in various places.

*The insert-feeding mechanism (station A).*

In the present instance, station A of the insert-feeding mechanism is shown as equipped to feed flexible paper inserts $a$ such as order blanks (see Figs. 4 and 8 to 11). The magazine comprises a suitable receptacle 2, which is equipped with a follower 3 located at the forward side of the upstanding sheets and arranged to be caused to press rearwardly on the sheets in any suitable way, as by connection with a cable or cables 4 (Fig. 4), each passing around a sheave 5 and having a weight 6 attached to its opposite end. A spring finger or fingers 7 on the magazine press against the rear side of the series of sheets near their upper edges.

The means for singly and successively withdrawing the sheets from the magazine comprises a pair of flexible suction cups 8 mounted on the ends of rigid conduit-sections 9 which are connected by flexible conduit-sections 10 to a stationary conduit 11 that communicates with an air exhausting means. This conduit 11 forms an abutment for the lower portion of the sheets in the magazine. The rigid conduit-sections 9 are swingingly supported from a rock shaft 12 through the medium of a pair of arms 13 fixed on said rock shaft, a rod 14 rotatably carried by the free ends of said arms, and a pair of arms 15 fixed on said rod and having the conduit sections 9 mounted thereon. On the ends of the rock shaft 12 are fixed a pair of arms 16 having on their free ends rollers which co-operate with a pair of rotary cams 17, said cams being fixed on a shaft 18 that is continuously driven from an inclined drive shaft 19 (Fig. 2) through bevel pinions 20. These cams 17 through the means described, cause the periodical retraction of the suction cups 8 from the body of sheets $a$ in the magazine, said cups drawing with them the rearmost sheet of the body. The cups are normally pressed toward the body of sheets in the magazine by means of a pair of arms 21 fixed on the rod 18 and carrying at their free ends rollers, which bear against stationary cams 22 fixed in the main frame. Coiled torsion springs 23 (Fig. 9) surrounding the rod 14 tend to press the arms 21 rearwardly against the cams 22 and thereby tend to move forwardly the arms 15 and other parts supporting the suction cups 8 and to hold the cups in engagement with the body of sheets in the magazine. When the rotary cams 17 cause the arms 15 and associated parts to swing upwardly, the stationary cams 22 will cause the arms 15 to swing forwardly and thereby give a downward as well as a rearward movement to the suction cups so that the rearmost sheet will be withdrawn from the magazine.

At the proper time the suction cups and the adjacent conduit sections are placed in communication with the air-exhausting means and after a sheet has been withdrawn from the magazine the exhaust is cut off and the cups and adjacent conduit-sections are placed in communication with the atmosphere, so that the sheet will be allowed to descend to the collecting conveyor.

The means for thus controlling the air exhaust comprises a crank device 24 (Figs. 9 and 10) fixed on the end of the shaft 18, a link 25 attached at one end to said crank and at its other end to a crank 26 fixed to the movable valve member 27 of a three-way valve 28 (Fig. 11). Depending on its position, this valve member 27 is arranged to place the suction cups 8 in communication either with a pipe 29 leading to the exhaust means, or with the atmosphere through an outlet 30.

The collecting conveyor 31 comprises a pair of chains running over sprocket wheels 32 and having cross pieces 33 which separate the conveyor into a series of sections each of which is adapted to collect a single group of articles or inserts from the successive stations. Beneath the upper run of the conveyor is a bed 34 which may be composed of a series of slats on which the articles are deposited and along which they are allowed to move down by the conveyor. The cross bars of the conveyor may have portions depending between the slats of the bed to prevent escape of the inserts. It will be apparent that due to the rather steep inclination of the conveyor the articles will slide along the slats 34 until their motion is arrested by one of the stop members 33 which is adapted to retard further motion and will collect the articles discharged from each of the stations and finally deliver them in an assembled group at the lower end of the conveyor.

*Insert stations B & C.*

Stations B and C are in the present instance substantially identical, and only one need be described in detail (see Figs. 4, 12 and 13). Each station comprises two magazines 35 arranged horizontally side by side and adapted to contain a series of relatively stiff postcards *b* in an upright position. A follower 36 in each magazine is arranged to urge the cards rearwardly by reason of the action thereon of a pair of cables 37 which pass around sheaves 38 and 39 and have their free ends weighted. A stop 40 for each magazine limits the rearward movement of the bunch of cards.

A section at the rear end of the bottom wall of each magazine is adjustable so that its rear edge may be positioned to expose only a single card whatever may be the thickness thereof when the bunch of cards is abutting against the stop 40. This adjustable rear section has a bracket 41 depending therefrom, and a screw 42 mounted on a fixed bracket 43 is arranged to engage the bracket 41 for adjusting the movable section.

An ejector 44 for each magazine is mounted to slide up and down on vertical guide rods 45 and has an adjustable plate 46 arranged to overhang the rearmost individual card in the magazine so that when the ejector descends it will force such card downwardly. The two ejectors for the two magazines are arranged to be simultaneously reciprocated by means of a horizontal crossrod 47 joining them, two eccentrics 48 fixed on a continuously driven shaft 49, and two eccentric straps 50 surrounding the eccentrics and connected by links 51 to the ends of the rod 47. The shaft 49 is connected by bevel gears 52 to the diagonal drive shaft 19 (Figs. 2 and 13). Beneath the rear end of the magazine is located a pair of feeding rollers 53 between which the cards are forced by the ejector slides, the rollers extending along both of the magazines. These rollers are geared together and to the shaft 49 by intermeshing gears and rotate continuously. Beneath the rollers is a chute 54 which guides the cards to the conveyor 31.

Means is provided for detecting the failure of the feeding means at the stations B and C to properly feed cards from the magazines, and in the present instance the detecting means for the two stations are identical and are connected together to be operated from a single shaft. Referring to Fig. 12, it will be noted that the chute 54 contains depending fingers 55 which form a backing for the card as it is fed from the feed rollers 53. Located behind the chute is an electric switch comprising a stationary switch element 56 and a pivoted switch element 57, the latter having a forwardly extending projection 58 arranged to pass through the rear wall of the chute to be engaged by a movable element for opening the switch. The switch element 57 is fixed on a rock-shaft 57ª which carries a corresponding arm for the companion card-magazine at this station, the latter arm carrying no switch devices however, since the single switch will serve for both magazines.

In front of the chute is a rock shaft 59 having fixed thereon an upstanding arm 60 for each magazine, each arm being provided with a bearing 61 to receive a slidable pin 62. On the end of this pin is a roller 63 and the pin is normally urged rearwardly by means of a coiled spring 64 surrounding the pin. A rearwardly projecting arm 65 on the rock shaft 59 is connected by a link 66 to a similar arm 65 on the detector mechanism of the other station C, the rock shaft 59 of the latter station being also provided with a forwardly projecting arm 67 (Fig. 4) which carries a roller that runs on a cam 68 fixed on a continuously driven shaft 69.

The cam 68 is so timed that the shafts 59 are rocked to swing the four arms 60 rearwardly just before the cards pass from between the feed rollers 53. If cards are present in the proper positions, the cards will intercept the movement of the spring pins 62 and prevent the rollers thereon from opening the electric switches 56, 57. If, for any reason, a card is absent from the proper position, then one of the spring pins will continue on its movement and will engage one of the arms on the rock shaft 57ª and open one of the switches 56, 57. Either one of said switches is arranged to break the circuit controlling the machine and thereby bring the entire machine to a stop.

Insert station D.

Station D of the article feeding means comprises in this instance two magazines 70 (Fig. 4) each adapted to contain a bunch of articles. The magazines are provided with followers 71 which are suitably arranged so as to press the envelopes rearwardly in the magazine as they are withdrawn therefrom. In the present instance, the magazines are inclined rearwardly and the followers are moved by gravity. The means for withdrawing the envelopes singly and successively may be similar to the means described for station A, and need be described only generally here. It comprises suction cups 72 connected by flexible conduits 73 to a conduit 74 which leads to air-exhausting means. The suction cups are carried by arms 75 mounted upon a rock shaft 76 which has a roller arm 77 bearing upon a cam 78 fixed on the shaft 69, the rotation of which cam causes the suction cups 72 to reciprocate. The connection between the suction cups and the air exhausting means is made and broken at the proper times by a crank 79 (Fig. 1) mounted on the shaft 69 and a link 80 connecting said crank to a crank 81 which operates a valve 82 in the same way as described for the valve 28 of station A. The conduits 29 and 83 for these two stations A and D are connected to a main exhaust conduit 84 (see Fig. 1) which leads to an air exhausting fan or pump 85 suitably driven as by a belt 86 from an electric motor 87.

The envelopes which are withdrawn from the magazines 70 pass by gravity through a chute 88 (Fig. 4) onto the collecting conveyor 31. It will be understood that the rate of the withdrawal of the articles from the various magazines and the rate of travel of the conveyor is such that one section of the conveyor receives only one article or pair of articles from each station.

*The catalog magazine and feeding means.*

The catalogs are contained in a box-like magazine 89 (see Figs. 1 to 5 and 14 to 16) which is open at its forward side and is arranged in an inclined position conforming to the inclination of the main frame. The catalogs are placed in this magazine with their bound edges rearward, and at intermittent periods all of the catalogs except the lowermost one are raised slightly to permit such lowermost one to be discharged rearwardly through a slot in the magazine. This means for raising the stack of catalogs comprises two irregularly shaped arcuate plates 90 (Figs. 14 and 15) fixed upon sleeves 91 which are located at opposite sides of the magazine and rotate in opposite directions. The arrow seen in Fig. 15 indicates the direction of rotation of that plate. The leading edges of said plates are arranged to enter the rear side of the magazine and pass between the lowermost catalog and those above it. 92 are guards which overhang the plates.

Each of the sleeves 91 surrounds and is fixed to a shaft 93 which is rotatably mounted in bearings 94 upon the framework. The shafts 93 are connected by bevel gears 95 to shafts 96 (Figs. 1 and 14) which are in turn bevel geared to a horizontal crossshaft 97 (Fig. 5) at the rear side of the magazine 89. This horizontal shaft 97 is connected at one end by bevel gears 98 to the inclined drive shaft 19 which forms the drive shaft for the insert stations as seen in Fig. 2.

The lower ends of the rotary sleeves 91 are of cam formation to co-operate with fixed cam faces 99 on the upper end of the lower bearings 94. Below these bearings are cams 100 which are fixed on the respective shafts 93 and have a function to be later described. The rotation of the shafts 93 is continuous and the action of the cam faces on the sleeves 91 and bearings 94 causes the periodical elevation of said sleeves and the plates 90, which elevation occurs after the plates have entered between the lowermost catalog in the magazine and those above it, with the result that the tier of catalogs except for the lowermost one is bodily elevated. It is desirable that all but the lowermost one of the catalogs in the tier thus elevated be supported at their rear edges after the plates 90 have passed out from beneath the tier, for the purpose of insuring the entry of the plates between two catalogs on the next rotation of such plates. This result is attained by providing a pair of swinging arms 101 having sections 102 at their lower ends which are provided with angular ends arranged to enter the magazine and engage the rear edges of the catalogs. The sections 102 are adjustably mounted on the arm to accommodate books of different thicknesses. These arms are fixed at their upper ends upon a horizontal shaft 103 (Figs. 4 and 14) which are mounted in bearings on the rear side of the catalog magazine. Coiled torsion springs 104 on the shaft 103 tend to swing the arms 101 forwardly so that the angular lower ends of the arms will engage between two catalogs in the magazine. The shaft 103 is periodically rocked to withdraw the arms by means of a depending arm 105 fixed on said shaft and arranged to be engaged by a rotary cam 106 which is fixed on one of the shafts 96 (see Figs. 1 and 14). This cam 106 is so timed with respect to the book-elevating means that the stop arms 101 are withdrawn after the plates 90 have entered the magazine and so that said stop arms are returned to engage between the first catalog on top of the cam plates and the next catalog above it before the plates 90 move out from beneath the tier to permit the tier to settle.

The means for ejecting the lowermost catalog in the magazine after the remainder of the tier has been elevated comprises a pair of ejector fingers 107 (Figs. 5 and 15) which are pivoted beneath the forward edge of the magazine and are arranged to be swung upwardly and rearwardly into engagement with the forward edge of the lowermost catalog so as to impart a quick movement to the catalog. Inasmuch as the bottom of the magazine is inclined, this initial force is sufficient to cause the catalog to slide rearwardly out of the magazine and into a guide chute 108. Each finger has a coiled spring 109 (Fig. 15) tending to swing it downwardly. The escape of the catalog is normally prevented by two stop fingers 110 (Fig. 16) loosely pivoted on a rock shaft 111 beneath the magazine and normally projecting upwardly across the exit slot at the rear corner thereof. The stop fingers are normally held in operative position by a pair of levers 112 having upstanding lugs 113 which are fixed on the rock shaft 111, one end of said levers underlying the stop fingers 107 and the opposite end underlying the ejector fingers 110. On one end of the rock shaft 111 is fixed an arm 114 (Fig. 16) which projects forwardly and downwardly and is arranged to be engaged by an arcuate cam 115 (Figs. 14 and 15) fixed with relation to one of the sleeves 91 which carry the catalog-raising plates 90. When these plates have been elevated to raise the tier of catalogs in the magazine (with the exception of the lowermost catalog) the cam 115 engages the arm 114 and rotates the rock shaft 111, thereby swinging the levers 112 to lower their rear ends and elevate their forward ends. This movement of the levers permits the withdrawal of the dogs 110 from the exit slot of the magazine, and simultaneously causes the elevation of the ejector fingers 107 into engagement with the lowermost catalog to cause the catalog to slide from the magazine and into the chute 108. After the cam releases the arm 114 a coiled spring 116 on the shaft 111 returns the levers 112 and other parts to their normal positions.

*Catalog-opening means.*

The chute 108 leading from the catalog magazine directs the catalog into a receptacle or box 117 which is positioned at the lower end of the insert-collecting conveyor 31 and in alinement therewith. The catalog stands in this box with its bound edge lowermost. Means is provided for entering between the leaves of the catalog and partially opening the latter. See Figs. 5, 26 and 27. This means comprises a knife 118 which is carried by the rear ends of a pair of arms 119, which arms are pivoted at their forward ends upon a shaft 120 mounted beneath the catalog magazine (see Figs. 1 and 5). A pair of springs 121 tend to hold the arms in their elevated position and the arms are periodically swung downward to cause the knife to open the catalog by means of the cams 100 on the shafts 93, said cams engaging roller-arms 122 fixed on the shaft 120. As the knife 118 enters between the leaves of the catalog a finger 123 fixed to and spaced forwardly from the knife passes along the forward face of the catalog so that the front half of the book is embraced between the knife and said finger. In order to prevent the leaves of the rear portion of the catalog from adhering to or following the knife, there is provided a means for pressing rearwardly against the rear portion of the book so as to spread the two sections of the book apart and insure a clear passage for the entrance of the inserts from the collecting conveyor. This spreading means comprises a pair of spring arms 124 fixed at their upper ends to the ends of the arms 119, and a suitable bearing portion 125 comprising a horizontal connecting strip joining said arms and one or more fingers depending from said strip and adapted to bear against the rear section of the opened catalog. The lower portion of the spring arms 124 are curved forwardly and on the extreme lower end of the arms are lateral projections 126. A pair of dogs 127 are pivoted at 128 to opposite ends of the opening knife 118 and each dog is provided in its lower edge with a notch 129 having square shoulders and with another notch 130 having one shoulder inclined toward the notch 129. A suitable spring 131 tends to swing each dog downwardly. When the knife is in its elevated position as seen in dotted lines in Fig. 26, the projection 126 on each of the spring arms 124 is engaged in the forward notch 129 in the adjacent dog. As the knife and associated parts move downwardly to open a catalog, the ends of the dogs 126 are carried into engagement with stationary pins 132 and the dogs are thus swung upwardly to disengage the notches 129 therein from the projections 126 on the spring arms 124 at which time the said arms spring rearwardly as far as is allowed by engagement of the projections 126 with the rear notches 130 in the dogs, and in such movement the leaf engaging device 125 carried by said spring arms presses rearwardly against the rear section of the catalog to hold the catalog properly opened.

In the upward movement of the parts after the articles have been deposited in the catalog, the projections 126 of the spring arms 124 come into engagement with cam bars or guide ways 133 which cause the spring arms to be swung forwardly until the said projections are engaged and held in the forward notches 129 of the dogs. The parts remain in this engaged position until the dogs encounter the stop pins 132 in the next descent of the parts. The opening of the catalog is, of course, timed with respect to the movement of the insert-collecting conveyor 31 so that the catalog will be in position to receive a group of inserts discharged by said conveyor. After the knife and associated parts have been withdrawn from the catalog the latter is folded on a longitudinal median line by means to be presently described.

*Catalog detector mechanism.*

If it should happen that a catalog fails to arrive at the proper time in the box 117 for any reason, it is desirable that the operator be notified immediately. I have provided means which is arranged automatically to stop the machine in the absence of a catalog in the box 117 at the proper time. This detector means is best illustrated in Figs. 5, 23, 28 and 29. It comprises an arm 134 fixed upon a rock-shaft 135 and carrying a detector 136 which, in the present instance, is of U shape in order to accommodate the catalog-folding blade to be later described. The detector is arranged to be moved into contact with a catalog $e$ in the receptacle 117, the movement of the detector arm being arrested by engagement with the catalog. The position of the parts in such engagement is indicated in dotted lines in Fig. 28. If no catalog is present in the receptable 117 the detector arm swings farther into the position shown in Fig. 29. The detector arm is arranged to be swung toward the catalog by means of a coiled spring 137 anchored at one end in the frame and at its other end attached to a depending arm 138 which is fixed on the rock shaft 135. This arm carries a roller which runs upon a rotary cam 139 having a dwell surface for the greater part of its periphery and having a single recess. This cam is fixed on a constantly driven shaft 140. When this recess is opposite the roller on the arm 138, the spring 137 draws the arm forwardly and thereby swings the detector rearwardly into engagement with a catalog, if one be present in the box 117.

An upstanding arm 141 is also mounted on the rock shaft 135 but is loose thereon so that it is not affected by rotation of said shaft. The upper end of this arm carries an electric contact head 142 which is arranged to engage between two contact heads 143 and normally maintain closed the working electric circuit of a machine. A coiled spring 144 tends to hold the arm 141 in this closed-circuit position as seen in Fig. 28. A short arm 145 is fixed on the rock shaft 135 and projects upwardly and is arranged to abut against a part 146 on the arm 141, if the detector moves farther rearwardly than it normally does when a catalog is present. The result is that in the absence of a catalog in the box 117 the arm 141 will be swung rearwardly to open the electric circuit of the machine at the contacts 142, 143, so that the entire machine will be stopped. The driving means for the catalog-opening mechanism and for the detector mechanism are so timed that the detector mechanism operates immediately after a catalog is dropped or should be dropped into the receptacle 117 and the detector arm then moves forwardly out of the way of the catalog-opening means which is then set in operation.

*Catalog-folding mechanism.*

The rear wall of the box 117 has a horizontal slot midway thereof and behind this slot is a guideway and a series of opposed rollers 147 leading rearwardly and downwardly (see Fig. 5.) The catalog is pushed through the slot and into the space between the rollers by means of a blade 148 which is adjustably mounted upon the upper ends of a pair of levers 149, said levers being pivoted upon a shaft 150 and carrying at their lower ends rollers which engage in grooves 151 (Fig. 17) formed in cams 152, said cams being fixed upon a shaft 153. When the folded catalog is engaged by the set of rollers 147 it is carried rearwardly and downwardly against a sheet of paper which constitutes a wrapper therefor and which has previously been fed into a horizontal table or support 154 located just above the lowermost pair of rollers 147.

*The wrapper feeding and pasting mechanism.*

A pile of sheets of paper or wrappers is supported on an inclined table 155 (Fig. 5) and the wrappers are arranged to be fed forwardly into position to be successively engaged and folded by the catalogs by suitable mechanism one form of which is herein illustrated. The wrappers first pass between a conveyor 156 and an overlying feed roller 157 which roller is intermittently driven by means to be later described. Each wrapper then passes on to a conveyor 160 which may comprise a series of tapes and which passes around one of the lowermost rollers 147 and around additional supporting rollers 161 and 162. A suitable stationary guard 163 overlies the conveyor 160 and may comprise a series of rigid strips. A constantly driven feed roller 164 overlies the rearmost one of the conveyor rollers 160 and co-operates with the conveyor in feeding the wrappers forwardly.

Located above the conveyor 160 is a means for applying adhesive to the rear edge of each wrapper as it passes along. This adhesive applying means may comprise a container 165, a driven roller 166 forming the forward wall thereof, and an adhesive applying device in the form of a bar 167 (Fig. 5) fixed upon a constantly rotating shaft 168 and having a plurality of spaced glue applying faces arranged to periodically contact with said roller and then with a wrapper. The conveyor roller 162 supports the wrapper when engaged by the bar 167.

The glue pot roller 166 is driven in the present instance by a ratchet wheel 169 fixed with relation thereto and a pawl 170 carried by a gear wheel 171 and engaging said ratchet wheel 169. The gear wheel 171 meshes with a pinion 172 fixed on an idler shaft 173 which shaft also has fixed thereon a gear wheel 174 that meshes with a pinion 175 fixed on the shaft 168 which constitutes the driver for the described gear train. The wrapper feeding roller 164 is driven by means of a pinion 176 fixed thereto and meshing with the gear wheel 171.

*Wrapper detector mechanism.*

I have provided means for detecting the absence of a wrapper on the support or table 154 in position to be engaged by the folded catalog. (See Figs. 5, and 20 to 22). This detector mechanism comprises a cam disc 180 fixed on the shaft 168 which disc is circular for the greater part of its periphery and has a single depression 181 therein. An arm 182 is fixed on a sleeve 183 which is loose on a shaft 184 and said arm carries at its free end a roller which runs on the periphery of the cam 180. Another arm 185 also fixed on said sleeve carries an electric switch element 186 at one end to co-operate with a stationary switch element 187 which is suitably mounted on a stationary cross-bar 188 of the machine, said switch elements being suitably insulated from their carrying parts. A detector finger 189 is fixed upon and depends from the sleeve 183, the lower end of said finger being located close to the plane of the wrapper conveyor 160. Beneath this finger is a stationary shelf 190 provided with grooves 191 in its upper face and the lower end of the finger 189 is bifurcated to adapt it to descend into the grooves in the shelf 190 in case a wrapper is not present above the shelf when the cam depression 181 arrives at the roller on the arm 182.

So long as wrappers are properly fed forward, the parts (except the cam 180) will remain in the position shown in Fig. 20 but if the wrapper feeding means fails to advance a wrapper the detector finger 189 will drop into the grooves in the shelf 190, when permitted to do so by the arrival of the notch 181 in the cam at the roller on the arm 182, with the result that the switch arm 185 will be swung to open the electric switch and stop the machine. Normally the presence of a wrapper would hold the detector finger up with the switch closed.

A gage 192 of irregular shape is pivoted directly on the shaft 184 and has its lower end closely overlying the wrapper conveyor 160 and fitting between the bifurcated ends of the detector finger 189. A bolt 193 passes through the gage 192 and through a fixed projection 194 on the stationary crosspiece 188, said bolt having a thumb nut 195 threaded thereon above said crosspiece for adjusting the position of the gage and thus regulating the distance between the adjacent faces of the gage and the conveyor 160 to accommodate different thicknesses of wrappers. A coiled spring 196 surrounds the bolt 193 between the projection 194 and the gage, and tends to spring the gage downwardly as far as permitted by the head of the bolt. If more than one wrapper should accidentally be fed from the pile simultaneously, the gage 192 would halt them and the detector finger 189 would then stop the machine.

*Wrapper-folding mechanism.*

When the wrapper is in final position above the two lowermost rollers 147 it lies with the central line of the wrapper offset with respect to the space between the two rollers so that the two flaps provided when the catalog pushes the wrapper down between the rollers are of unequal length, the rearmost flap as viewed in Fig. 5 being the longer. When the catalog and the partially folded wrapper emerge from between the rollers 147, the catalog and wrapper descend into an oscillatory box-like holder 200 (Figs. 5 and 17 to 19) which is mounted to swing about on journals 201 through an arc of approximately 180 degrees. A curved wall 202 extends adjacent to the arc described by the upper end of the box so that when the box starts its downward rotary movement the longer flap of the wrapper which projects upwardly from the box, is engaged by this curved wall and is bent forwardly across the open end of the box, or in other words the projecting flap of the wrapper simply drags along on account of its engagement with the curved wall. When the box has completed its 180 degrees movement the catalog and the wrapper are ejected therefrom and pass between a pair of folding rollers 203. Due to the position of the longer flap of the wrapper, caused by its engagement with the arcuate wall 202, said flap is folded up alongside of and in contact with the opposite flap of the wrapper in passing through the rollers 203, and the adhesive on the longer flap causes the two flaps to firmly adhere to seal the package.

The box or holder 200 comprises in the present instance a side wall and a bottom wall rigidly secured together and a second side wall 200ª which is pivoted at 204 to the bottom wall and which is normally pressed toward the other side wall by means of a leaf spring 205. An arm 206 pivoted at 207 to the upper edge of the stationary side wall bears against a stationary cam 208 located along the axis of movement of the box, and a roller 209 carried by the pivoted side wall bears against this arm and is so held by the leaf spring 205. When the box is in its upright position ready to receive a partially wrapped catalog the cam 208 acting on the lever 206 causes the pivoted wall 200ª to be held spaced away from the fixed wall so that the box is open to receive the catalog. As the box swings rearwardly the cam 208 allows the arm 206 to move so as to permit the pivoted side wall 200ª to close upon the catalog and compress the latter.

The box 200 is arranged to be oscillated by means of pinions 210 fixed on the journals of the box and racks 211 meshing with said pinion and each carried by a slidable bar 212 of offset shape which is guided in suitable bearings 213 in the framework. Said bars carry rollers 214 which run in grooves 215 in a pair of rotary cams 216 fixed to the continuously driven shaft 153.

When the box 200 is in its inverted position the catalog and surrounding wrapper are forcibly ejected therefrom and are started between the rollers 203. The ejecting means comprises a pair of levers 217 pivoted at 218 in hangers 219 which depend from a cross bar of the framework, each lever having one end normally lying adjacent to the axis of the box 200. The side walls of the box are slotted to receive said ends of the levers and when the box is in its inverted position the levers are swung to push the catalog and wrapper from the box. This movement of the levers is caused by the engagement of the opposite ends of the levers with a pair of rotary cams 220 which are fixed on the continuously driven shaft 153. Leaf springs 221 bearing against the latter ends of the levers hold them in engagement with said cams. Each cam has a dwell surface for the greater part of its periphery and has a sharp projection adapted to cause a sudden descent of the catalog-engaging end of the lever to eject the catalog.

*The wrapper printing mechanism.*

After the completely wrapped catalog leaves the final folding rollers 203 it passes downwardly between a series of feed rollers 225 (Fig. 5) arranged in pairs one above the other. Means is arranged at this point for printing upon the wrapper such data as may be desired, as for example the name and address of the sender, the name and address of the addressee, and words and figures indicating that postage for the package has been prepaid. This printing mechanism may be of any desired character. By way of example I have illustrated in the drawings in a somewhat diagrammatic manner one form or construction which may be employed. See Figs. 5 and 6. The mechanism herein shown comprises a cylinder 226 having thereon a type block 227 (Figs. 31 and 32) to print the sender's name and address and a resilient ink-carrying projection 228, the latter being arranged to cooperate with stencils to print the names and addresses of the addressees. The cylinder further carries a printing device 229 which is removably mounted in a recess in the cylinder and which is arranged to print suitable words and consecutive numbers on the wrappers to indicate prepayment of postage. The device 229 is to be set by the postal authorities for a certain number of impressions and is to be locked by the postal authorities to prevent tampering therewith, it being necessary for the user of the machine to remove the device from the printing cylinder 226 and return it to the postal authorities to have it reset after a certain number of impressions have been made on the wrapped packages.

In the exemplary form herein shown the device 229 comprises a counting and printing mechanism which is indicated at 230 in Fig. 31, and actuating means therefor comprising a reciprocatory bar 231 (Fig. 32), a spring pressed pawl 232 carried by said bar and arranged to engage a ratchet wheel 233 which is fixed on the shaft of the counting mechanism, the bar 231 being arranged to be pushed inward by engagement with the wrapped catalog and to be drawn outward by a spring 234 so that at each engagement with a catalog the permit number printed on the wrapper will be increased by one.

In the present instance the printing of the addresses of the addressees is arranged to be effected through stencil plates which are carried to the printing cylinder by means of a pair of endless conveyors 235 and 236, the position of the stencils being so arranged with respect to the position of the ink-carrying device 228 on the cylinder that said device will print through the stencil on the wrapper of the catalog. The three printing devices on the cylinder are arranged to be inked by suitable mechanism which in the present instance comprises an inking roller 237 associated with a fount 238 and an intermediate roller 239 to transfer ink from the roller 237 to the printing devices on the cylinder.

The stencils are contained in a magazine 240 (Fig. 6) and are fed one by one from the bottom of said magazine by suitable means which in the present instance comprises a rotary shaft 241, an eccentric 242 fixed thereon, a pusher or ejector 243 slidable on a guide 244, and a strap 245 surrounding the eccentric 242 and having an arm attached at 246 to the pusher, said pusher being arranged to successively engage the lowermost stencil in the magazine and push the same between two feed rolls 247 which are geared together and to the shaft 241. These feed rolls move the stencil between the conveyors 235 and 236 which conveyors carry the stencil to the printing position.

After a wrapped catalog has been printed it passes downwardly into a chute or guideway 248 which delivers the same to any desired point. The stencil is carried on around the printing cylinder into association with a conveyor 249 and thence into position above a stack of tags in a magazine 250 which is provided with a counterbalanced follower 251. The top tag is printed upon through the stencil by means of a printing cylinder 252 having a resilient ink-carrying device 253 thereon, said device being inked by an intermediate roller 254 from the inking fountain roller 237. After being printed the uppermost one of the tags in the magazine 250 is engaged by projections 255 on the printing cylinder 252 and is pushed from the stack onto a feed roller 256 and thence into a chute 257 which is arranged to deliver the tag to the point at which a series of the wrapped catalogs are collected, the tag being applied to the mail bag into which said wrapped catalogs are received. The printing on the tag indicates the destination of the mail bag.

The tag printing mechanism is actuated only once for a given number of wrapped packages delivered from the machine. The means for controlling the actuation of the tag printing means comprises a cam 258 (Fig. 5) fixed on the shaft of the printing cylinder 226, and a lever 259 pivoted at 260 and having on one end a roller running on the periphery of the cam 258, the other end of said lever carrying an electric contact 261 arranged to overlie the path of the stencils. Directly beneath this contact is a stationary contact 262, said two contacts being included in an electric circuit 263 receiving power from a battery or other suitable source 264.

This circuit contains a solenoid 265, the armature 266 of which acts upon a bell-crank lever 267 pivoted on a shaft 268. The tag-printing cylinder 252 is mounted on the end of the horizontal arm of this lever 267 and is constantly driven by a sprocket chain 269 running over sprocket wheels 270 and 271 fixed respectively to the cylinder and the shaft 268. The stencils are arranged in the magazine 240 in a certain order and one of every certain number of stencils is provided with an aperture which when the stencil registers with the contacts 261, 262 will permit the contacts to touch temporarily and thereby close the electric circuit 263 to actuate the solenoid 265 and momentarily lower the tag printing cylinder into engagement with the stencil then above the stack of tags, so as to print on the top tag.

After the tag has been printed the stencil is pushed along past the chute 257 and onto a conveyor 272 (Fig. 6) which finally deposits it in a chute 273 leading to a collecting receptacle 274. This receptacle is provided with a movable abutment 275 and a pusher 276 which is reciprocated by a rotary cam 277 through the medium of a lever 278 and a link 279. The pusher maintains the stencils in order and gradually moves the row rearwardly to leave space for the newly arriving stencils.

*The driving mechanism.*

The machine is arranged to be driven by an electric motor which is shown only diagrammatically in Fig. 30, the motor being belted to the main drive pulley 285 (Fig. 3) of the machine. This pulley is fixed on a shaft 286 which has a hand wheel 287 fixed on the opposite end thereof and also has a spur pinion 288 fixed midway thereon, said pinion meshing with a large spur gear 289 on the shaft 153. (See Figs. 1, 2, 3, 5 and 19.) On the right hand end of the shaft 153 is a spur gear 290 which meshes with a spur gear 291 (Fig. 1) fixed on the shaft 140 which carries the actuating cam for the catalog detector means. On the opposite end of this shaft 140 is a pinion 292 (Fig. 2) which meshes with a similar pinion on the lower end of the diagonal drive shaft 19 that actuates the insert feeding mechanisms and the catalog-feeding mechanism.

The lower shaft of the insert collecting conveyor 31 is driven from the main drive shaft 286 through the medium of an upright shaft 293 (Fig. 1) which is geared to the shaft 286 and said conveyor shaft. This upright shaft 293 is connected by bevel gears 294 to one of the series of catalog-folding rolls 147 whereby the series of rolls are driven through the intermeshing gears 295 shown in Fig. 7, (Sheet 4). One of the lowermost pair of these catalog folding rolls is connected by bevel gears 296 to an upright shaft 297 (Fig. 1) which in turn is connected by bevel gears 298 to one of the pair of rolls 203 which fold the final flap of the wrapper about the catalog. This roll is connected by a sprocket chain 299 (Fig. 5) to a roll 300 which constitutes the driving roll for the stencil conveyor 235. This driving roll 300 actuates the inking roller 237 and the printing cylinder 226 through the medium of sprocket chains 301. The rollers 203 and 225 are connected by a train of gears 302.

The forward one of the folding rollers 203 is connected by a sprocket chain 303 (Fig. 2) to the shaft 304 of one of the lowermost stencil conveyors 249 and this shaft is in turn connected by a chain 305 to the roll 256 which roll is in turn connected by a chain 306 to the shaft 307 of the lowermost and rearmost stencil conveyor 272. This roll drives the shaft of the stencil pusher cam 277 and the shaft 241 of the stencil ejecter through the medium of chains 308 and 309.

The shaft 168 which carries the cam of the wrapper detector mechanism is connected by bevel gears 310 to an oblique shaft 311 (Fig. 2) which is connected by bevel gears 312 to the shaft 153 to be driven from the latter.

The means for intermittently actuating the rearmost wrapper-feeding roller 157 is illustrated in Figs. 1, 24 and 25 and comprises a reciprocatory bar 315, the upper end of which is attached to a crank 316 fixed on the shaft 97. The lower end of the bar 315 is toothed to provide a rack 317 and to opposite sides of this rack are fixed two plates 318 which have slots 319 to receive a pinion 320 (Fig. 25), said pinion having grooves to receive and guide the plates 318, and the pinion meshing with the rack 317. The pinion is loosely mounted on the shaft of the roller 157, and on the end of said shaft adjacent to said pinion there is fixed a ratchet wheel 321 which is engaged by a pawl 322 pivoted on one side of the pinion 320. In the reciprocations of the bar 315 the pawl will intermittently engage and rotate the ratchet wheel and therefore the roller 157.

*Electric driving and controlling mechanism.*

In Figure 30 I have illustrated in diagrammatic form one way of driving and controlling the hereinbefore described mechanism by electric means. The main driving motor is designated 324 and it is connected by suitable wires 325 to the main rheostat or starting box 326. This box is suitably connected to the power line 327, there being in the present instance a switch 328 interposed in the line adjacent to the box. The suction pump 85 for the insert-feeding mechanisms is driven by the motor 87 which is connected by wires 329 to a starting box 330, said box being connected through a switch 331 to conductors 332 running to the main power line.

Certain terminals on the main starting box 326 are connected by wires 333 to a series of switches any one of which is arranged to open the circuit and automatically stop the driving motor 324. Some of these switches viz. those designated 56—57, 142—143, and 186—187, have been previously described and they are shown in Fig. 30 only in symbolic outline. A main starting switch 336 is arranged on the right hand side of the machine as seen in Fig. 1 and comprises two buttons, one for starting the motor and the other for stopping the same. There are also two switches 337, and 338 for stopping purposes only, one being located on the right hand side of the machine adjacent to the catalog magazine (see Fig. 1) and the other located between the insert stations C and D near the left hand side of the machine.

When any one of the switches 56—57, 142—143 or 186—187 is opened by failure of the proper feeding of an insert, a catalog, or a wrapper, as the case may be, the main electrical circuit is opened, the driving motor 324 is stopped, and the usual starting handle of the rheostat 326 is automatically returned to its initial position. The only place that the machine can again be started is at the main starting switch 336 which is arranged to close the main circuit.

While I have herein disclosed the preferred embodiment of my invention in considerable particularity for the sake of clearness, I recognize that various alternatives will occur to persons skilled in this art, and I therefore do not confine my invention to the present disclosure but aim to cover in the appended claims all modifications and equivalents falling within the scope of the invention.

I claim as my invention:

1. A machine of the character described having, in combination, a plurality of magazines for articles, mechanism for individually withdrawing articles from the respective magazines, means for collecting groups of the withdrawn articles, a magazine for books, means for singly and successively withdrawing books from said magazine, means for opening a withdrawn book to receive a group of articles, means for then folding the book with the articles therein, means for then placing a wrapper about the folded book, and means for printing upon the wrapper on the wrapped book.

2. A machine of the character described having, in combination, mechanism arranged automatically to deliver a group of articles at a certain point, mechanism for delivering a book at such point and for opening the book to receive the group of articles, and mechanism for wrapping the book with the articles therein.

3. A machine of the character described having, in combination, a plurality of magazines each equipped with means for withdrawing articles therefrom, means for collecting a group of such withdrawn articles and for delivering the group at a certain point, mechanism arranged to singly and successively deliver books at such point, means for then opening each book to receive a group of articles, and mechanism for then folding and wrapping the book with the articles therein.

4. A machine of the character described having, in combination, mechanism arranged to deliver books at a point to receive articles, means for opening the books, means for gathering groups of articles and delivering them into the open books, and mechanism for placing wrappers about the books with the articles therein.

5. A machine of the character described comprising, in combination, mechanism for delivering to a common point relatively large books of substantially one size, means adapted to pass between the leaves of a book to open the same to admit articles therebetween, said articles being variform but relatively small to be enclosed within the edges of said book when closed, magazines for the individual articles suitably proportioned thereto and mechanism associated with each of said magazines for withdrawing articles and placing them in separate heterogeneous collections and delivering same into the open books substantially as described.

6. A machine of the character described comprising, in combination, a magazine for relatively large books of substantially uniform shape, means adapted singly and successively to remove books from said magazine to a common point, means for opening said books to admit articles between the leaves thereof, said articles being diversiform but relatively small to be confined within the limits of a book when closed, magazines and delivery mechanisms individual to said various articles for storing the articles and releasing the same in predetermined definite quantities to compactly arranged heterogeneous collections and successively to deliver same into said open books substantially as described.

7. A machine of the character described having, in combination, means for automatically feeding books, means for automatically placing articles therein, and means for wrapping the books and contained articles.

8. A machine of the character described for inserting between the leaves of relatively large books of substantially uniform shape, relatively small articles of different forms comprising, in combination, means for selecting a group containing a definite quantity of articles of all of the forms and delivering same to a common point, and means adapted to deliver books singly to said point and to open the same to receive said groups of articles selected therefor.

9. A machine of the character described having, in combination, mechanism for feeding books to a certain point and for opening the books to receive articles, mechanism for feeding and collecting articles in groups and depositing the groups in the successive books, mechanism for feeding wrappers and for placing the wrappers about the books and contained articles, and means detecting the improper functioning of any of said feeding means.

10. A machine of the character described having, in combination, article-feeding means, book-feeding means, wrapper-feeding means, and detector means for detecting the improper functioning of any of said feeding means.

11. A machine of the character described having, in combination, article-feeding means, book-feeding means, wrapper-feeding means, and means normally tending to stop said feeding means and being arranged to contact with the successive articles, books and wrappers if properly fed, and to be thereby prevented from stopping said feeding means.

12. A machine of the character described having, in combination, means for delivering successive books at a certain point and for opening the books to receive articles, means for gathering groups of articles from a plurality of sources and placing the separate groups in the respective books, means for feeding wrappers and for placing the wrappers about the books and contained articles, an electric circuit arranged to control the driving power to the aforesaid means, a plurality of switches in said circuit, by opening any one of which switches the machine may be stopped, and means for detecting the absence of an article, a book or a wrapper at definite points in the machine and for opening said switches to stop the machine in the event of such absence.

13. In a machine of the character described, the combination with a series of magazines and a conveyor arranged to travel past said magazines to collect articles from each and to deposit same in groups at a common point, said articles being variform and adapted for insertion between the leaves of a book and said magazines being individually proportioned to the articles stored therein, of delivery mechanism between said magazines and said conveyor to pass said articles from the magazines in definite quantities from each to said conveyor.

14. A machine of the character described having, in combination, a plurality of magazines adapted to contain articles, means at each magazine for successively withdrawing the articles therefrom, a conveyor having a plurality of sections and being arranged to gather in each section a single group of articles from the respective magazines, and mechanism arranged to successively present partially opened books in position for each book to receive a group of articles from said conveyor.

15. A machine of the character described having, in combination, a plurality of stations arranged in a row, each station comprising a magazine to contain articles and means for successively withdrawing articles from the magazine, and an endless conveyor running beneath the stations and having sections each arranged to receive articles from the successive stations so that each section collects a single group of articles, means for successively feeding books into position to receive successive groups of articles from the conveyor, and means for opening each book at the proper time to receive the articles.

16. A machine of the character described having, in combination, an article-collecting conveyor disposed so that the plane of its travel is inclined with respect to vertical and horizontal planes, means for automatically placing on said conveyor separate groups of articles, means for successively placing books adjacent to the lower end of the conveyor with the folded or bound edge of each book lowermost, and means for partially opening each book to receive a group of articles from said conveyor.

17. A machine of the character described having, in combination, a magazine adapted to support loose sheets in upright position, a suction cup, a tubular arm supporting said cup, the cup and arm being arranged to be placed in communication either with the atmosphere or with a suction means, means for imparting to said arm and cup a combined downward and retracting movement when the cup is in engagement with one of the sheets in the magazine and is in communication with said suction means, whereby to withdraw the engaged sheet from the magazine, means for receiving the sheets and other articles and assembling them into groups, and mechanism for inserting the groups into books or the like.

18. A machine of the character described having, in combination, a pair of magazines located side by side and arranged to contain relatively stiff cards and ejecting means comprising a pusher for each magazine arranged to reciprocate in the plane of the endmost card to successively push the endmost cards from the magazine, a rod connecting both pushers, a pair of eccentrics and links for reciprocating said rod, and mechanism for automatically inserting the ejected cards into books or the like.

19. A machine of the character described comprising, in combination, an endless conveyor for articles arranged to discharge the articles at a common point into books, said articles being variform but of a size to fit in between the leaves of a book, magazines over the conveyor for each individual form of article and delivery mechanism proportioned to said articles to remove the same in definite quantities from said magazine and to deposit them on said conveyor substantially as described.

20. A machine of the character described comprising, in combination, a traveling conveyor divided into sections, magazines over the conveyor, articles of varying form stored separately in quantities in each magazine, delivery mechanism between said magazines and said conveyor, said mechanisms being proportioned individually to the articles to be handled thereby, and means for actuating said conveyor and said delivery mechanisms cooperatively so that said conveyor sections receive a definite number of articles from each of said magazines and collect similar aggregate groups for insertion separately between the leaves of books.

21. A machine of the character described having, in combination, an endless traveling conveyor, a plurality of means for supporting articles, means for withdrawing articles from said supporting means and depositing the articles on said conveyor, and means for cooperatively actuating said conveyor and said withdrawing means so that the conveyor will assemble in separate groups various predetermined numbers of articles from the successive supporting means.

22. In a machine of the character described, the combination with a series of magazines and a conveyor arranged to travel past said magazines to collect articles from each and to deposit same in groups at a common point, said articles being variform and adapted for insertion between the leaves of a book and said magazines being individually proportioned to the articles stored therein, of delivery mechanism between said magazines and said conveyor to pass said articles from the magazines in definite quantities from each to said conveyor, and detector means arranged to detect the failure of said delivery mechanism properly to pass said articles to said conveyor.

23. A machine of the character described comprising, in combinatiton, an endless conveyor for articles arranged to discharge the articles at a common point into books, said articles being variform but of a size to fit in between the leaves of a book, magazines over the conveyor for each individual form of article, delivery mechanisms proportioned to said articles to remove the same in definite quantities from said magazines and to deposit them on said conveyor, and detector means arranged to detect the failure of said delivery mechanisms to remove articles and deposit them on said conveyor.

24. A machine of the character described having, in combination, a receptacle having a slotted back, means for delivering a folded book and a wrapper partially encircling said book to said receptacle, means for rotating said receptacle, and means adapted to enter the slots in the back of said receptacle at the end of its rotation to eject said book and wrapper.

25. A machine of the character described having, in combination, a pivoted receptacle having slots in the back portion thereof, cam-actuated means for rotating said receptacle through a portion of a revolution, cam-actuated levers adapted at the end of the rotation of said receptacle to enter said slots and eject the contents of said receptacle and a single shaft carrying cams for the actuation of said receptacle rotating means and said levers.

26. A machine of the character described having, in combination, a folding blade adapted to periodically strike a book, folding it centrally and delivering it to conveyor mechanism, a pivoted receptacle adapted to receive the folded book from said conveyor mechanism and rotate it through a portion of a revolution, levers adapted to eject the book from said receptacle at the end of its rotation, and a single shaft carrying cams for the actuation of said folding blade, said receptacle rotating means, and said levers.

27. A machine of the character described having, in combination, a magazine to contain books, means arranged to enter the magazine and pass between the lowermost book and the tier above it and elevate said tier, means for then discharging the said lowermost book, means for opening said books, and means for automatically inserting articles in the successively opened books.

28. A machine of the character described having, in combination, means to support a stack of books, means for raising the stack with the exception of the lowermost book, means for then removing the lowermost book from beneath the remainder of the stack, and means for automatically placing inserts in the successively removed books.

29. A machine of the character described having, in combination, a magazine to receive books, a pair of plates arranged to enter the magazine and pass between the lowermost book and the tier above it, means to cause the elevation of said plates after such entry, means for ejecting the lowermost book after such elevation, means for opening said books, and means for automatically placing articles in the successively opened books.

30. A machine of the character described having, in combination, means for supporting a stack of articles, means for raising the stack with the exception of the lowermost article, means for then withdrawing the lowermost article from beneath the remainder of the stack, means arranged to engage between the first and second articles above said raising means to limit the descent of all of the articles except the said first one above the raising means, and means for automatically associating inserts with the successively withdrawn articles.

31. A machine of the character described having, in combination, a magazine to contain a stack of articles, plate-like means arranged to enter the magazine and pass between the lowermost article and the remainder of the stack, means for causing the rise and fall of said plate-like means while beneath the stack, means for ejecting the lowermost article while the remainder of the stack is raised, means arranged to limit the descent of the stack except the first article above said plate-like means, whereby to insure entry of said plate-like means between two articles in the next movement of said means, and means for automatically associating inserts with the successively ejected articles.

32. A machine of the character described having, in combination, means to support a stack of articles, a pair of rotary plates arranged to enter between the lowermost article and the remainder of the stack, means for raising said plates, means for removing the lowermost article while the remainder of the stack is raised, means to insure the entry of said plates between the two lowermost articles of the stack at the next cycle of movement, and means for automatically associating inserts with the successively removed articles.

33. A machine of the character described having, in combination, an inclined magazine to receive a stack of articles, a pair of rotary plates arranged to enter the lower corner of the magazine and pass between the two lowermost articles therein, means for elevating said plates, means for then engaging the higher edge of the lowermost article and ejecting the same from the magazine, and means for automatically associating inserts with the successively ejected articles.

34. A machine of the character described having, in combination, an inclined magazine having a rearwardly sloping bottom wall and adapted to receive a stack of books with their bound edges lowermost, a plate-like means arranged to enter the lowermost corner of the magazine and pass between the first and second books therein, means for causing the rise and fall of said plate-like means, whereby to elevate the stack with the exception of the lowermost book in the magazine, means for then sharply engaging the higher edge of the lowermost book to cause the book to slide rearwardly out of the magazine, and means for automatically placing inserts in the books removed from the magazine.

35. A machine of the character described having, in combination, an inclined magazine having a rearwardly sloping bottom wall and adapted to receive a stack of books with their bound edges lowermost, plate-like means arranged to enter the lowermost corner of the magazine and pass between the first and second books therein, means for causing the rise and fall of said plate-like means, whereby to elevate the stack with the exception of the lowermost book in the magazine, means acting while the stack of books is elevated to engage between the first two books above said plate-like means at the bound edges of said books, and arranged to limit the descent of all but the lower one of said two books when the plate-like means moves from beneath the stack and allows the stack to settle, means for ejecting the lowermost book while the remainder of the stack is elevated, and means for automatically placing inserts in the successively ejected books.

36. A machine of the character described having, in combination, a magazine adapted to contain a stack of books, and being inclined rearwardly so that the bound edges of the books are lower than their opposite edges, means for successively elevating all of the stack except the lowermost book, means for ejecting said lowermost book rearwardly, means to receive the ejected book with its bound edge lowermost, means to engage between the leaves of the book and partially open the book, and means for placing loose sheets in the opened book.

37. A machine of the character described having, in combination, means for supporting a supply of books, means for successively feeding books therefrom, means to receive and support the successive books with their bound edges lowermost, means arranged to enter between the leaves of each book and partially open the book, and means for depositing inserts in the opened book.

38. A machine of the character described having, in combination, a receptacle adapted to support a book with its bound edge lowermost, means for singly and successively feeding books to said receptacle, means for partially opening each book, said opening means comprising a knife adapted to descend between the leaves of the book, means for spreading apart the sections of the book separated by said knife, and means for depositing inserts in the opened book.

39. A machine of the character described having, in combination, means for supporting a book, means for singly and successively feeding books to said support, means to enter between the leaves of said book, means for spreading apart the sections of the book divided by the last-named means, and means for depositing inserts into the opened book.

40. A machine of the character described having, in combination, means for supporting a book or the like, a reciprocatory knife arranged to enter between the leaves of the book, and means governed by the movement of said knife for spreading apart the sections of the book divided by the knife.

41. A machine of the character described having, in combination, means for supporting a book, a pair of pivoted levers, a knife supported by said levers and arranged to enter between the leaves of the book, a spreading device arranged to enter the book with said knife, and means operable in the entering movement of the knife for causing lateral movement of the spreading means away from the knife to open the book.

42. A machine of the character described having, in combination, means for supporting a book, a reciprocatory knife arranged to enter between the leaves of the book, spreading means arranged to enter the book with said knife, and means for actuating said spreading means comprising a dog moving with the spreading means and a stationary stop arranged to engage said dog and trip the spreading means.

43. A machine of the character described having, in combination, mechanism arranged to deliver bound books at a point to receive articles, means for opening the books, a plurality of magazines, and mechanism arranged to withdraw articles from said magazines and to collect the articles in groups and deliver them into the opened books.

44. A machine of the character described having, in combination, a magazine for bound books, means for singly and successively feeding books from said magazine to a certain point, means for opening the books at such point, a plurality of magazines each equipped with means for singly and successively withdrawing articles therefrom, and means arranged to collect definite groups of articles from the respective magazines and to deliver the groups into the open books successively.

45. A machine of the character described having, in combination, means for collecting separate groups of inserts, means for singly and successively feeding books into position to receive the inserts, means across the path of movement of which the books are fed whereby the movement of the means is mechanically obstructed by engagement with a book, mechanism for automatically stopping the machine, the latter means when unobstructed, engaging and operating said automatic stop mechanism.

46. A machine of the character described having, in combination, means for supporting a book, means for singly and successively feeding books to said support, and means for detecting the presence or absence of a book on said support, said means comprising a reciprocatory part arranged to move across the path of the book if absent and to be obstructed by a book if present.

47. A machine of the character described having, in combination, means for selecting a group of articles and for delivering them at a certain point, and means for delivering a bound book at such point and for opening the book to receive the articles from said article-delivering means.

48. A machine of the character described having, in combination, means for periodically feeding books, resiliently actuated means normally tending to move across the path of said books cam means adapted to hold said resiliently actuated means out of the path of said books and to release said means for movement toward the path of said books when a book should be in position, and means engaged and operated by said resiliently actuated means in the absence of a book for automatically stopping the machine.

49. A machine of the character described having, in combination, means for periodically delivering sheet-like pieces of material, a resiliently mounted plunger, a movable support for said plunger, means for periodically actuating said support to move said resiliently mounted plunger into and past the path of said piece of sheet-like material at a time when said piece should be in position to obstruct the movement of said plunger, and automatic stop means engaged and operated by said plunger upon movement past the path of said piece of material.

50. A machine of the character described having, in combination, means for feeding articles, means for stopping said feeding means, means including a reciprocatory part arranged to contact with each successive article for controlling the operation of said stopping means, and means for automatically associating inserts with the articles.

51. A machine of the character described having, in combination, mechanism for delivering books and inserts at a certain point and for placing the inserts in the book, automatic means for stopping said mechanism, and mechanical means dependent on contact with the book at such point and in the absence of a book movable past the path of movement of the books to engage and operate said automatic stopping mechanism.

52. A machine of the character described for inserting in relatively large books of substantially uniform shape relatively small articles of various forms comprising, in combination, a conveyor composed of sections, a plurality of feed stations over said conveyor, containers at each station individually proportioned to the size and form of the articles stored therein and delivery mechanisms for each of said containers proportioned to the articles to be handled thereby for removing articles from said containers and depositing them on said conveyor substantially as described.

53. A machine of the character described having, in combination, mechanism for associating inserts with articles, means for successively feeding wrappers into position to receive such articles and inserts to be wrapped, means for folding the wrappers about the articles, gage means to prevent more than one wrapper being fed at a time, and detector means to detect the failure of the wrapper-feeding means to function.

54. A machine of the character described having, in combination, mechanism for associating an insert with an article, means for feeding a wrapper into position to receive such article and insert to be wrapped, means for applying an adhesive to the trailing edge of such wrapper, means for placing the article and the insert upon the wrapper and for partially folding the wrapper about the article and the insert, leaving said trailing edge projecting beyond the article, and means for then folding said trailing edge about the article and causing it to adhere to another portion of the wrapper.

55. A machine of the character described having, in combination, mechanism for placing an insert in a book, a support for the book having a slot in one wall, a series of pairs of rollers located behind said slot, a reciprocatory knife arranged to push the book and the insert through said slot and between said rollers for folding the book, means for feeding wrappers into position to be engaged and folded by the folded book, means for applying an adhesive to each wrapper, and means for folding the final flap of the wrapper comprising an oscillatory receptacle for the partially wrapped book, an arcuate wall adjacent to the path of movement of the upper edge of said receptacle, and a pair of folding rollers arranged to fold the final adhesive-treated flap on the wrapper into contact with another portion of the wrapper.

56. A machine of the character described having, in combination, means for placing an insert in a book, means for then folding the book, means for partially placing a wrapper about the book with one flap of the wrapper projecting beyond the book, and means for folding the final flap of the wrapper comprising an arcuate wall, an oscillatory device to receive the partially wrapped book and drag the projecting flap along said wall, and a pair of rollers arranged to fold the projecting flap against another portion of the wrapper to cause it to adhere thereto.

57. A machine of the character described having, in combination, mechanism for placing an insert in a book, mechanism for then folding the book and for partially placing a wrapper about the book with one flap of the wrapper projecting beyond the book, said flap being treated with adhesive, and means for folding the final projecting flap of the wrapper comprising an oscillatory box arranged to oscillate through an arc of approximately 180 degrees, a pair of folding rollers, means for causing the projecting flap of the wrapper to drag, and means for ejecting the partially wrapped book from said box and forcing it between said rollers, the latter acting to fold the final flap alongside another portion of the wrapper to cause the flap to adhere.

58. A machine of the character described having, in combination, mechanism for automatically associating an insert with an article, means for then placing a wrapper about the article with one flap of the wrapper projecting beyond the article, said flap being treated with adhesive, an oscillatory receptacle to receive the partially wrapped article, means arranged to cause the projecting flap of the wrapper to drag as the receptacle oscillates, a pair of folding rollers, and means for ejecting the partially wrapped article from the receptacle and passing it through said rollers to cause the projecting flap to adhere to another portion of the wrapper.

59. A machine of the character described having, in combination, mechanism for associating an insert with an article, means for then placing a wrapper about the article with one flap of the wrapper projecting beyond the article, said flap being treated with adhesive, an oscillatory receptacle comprising two sides, one of which is hinged and is spring-pressed toward the other side, a a stationary cam adjacent to the axis of movement of said receptacle, an arm pivoted to the stationary side of the receptacle and engaging a roller on the pivoted side thereof and also engaging said cam, the cam acting through said arm to hold the sides of the receptacle spread apart to receive the partially wrapped article and the cam allowing the pivoted side to move toward the other side to compress the article when the receptacle moves, an arcuate wall arranged to cause the projecting flap of the wrapper to drag, a pair of folding rollers, and means for ejecting the partially wrapped article from said receptacle and for inserting the edge of the article adjacent to said projecting flap between said rollers, the latter acting to press the flap alongside of another portion of the wrapper to cause the flap to adhere thereto.

60. A machine of the character described having, in combination, mechanism for inserting an article in a book, means for automatically wrapping the book and the contained article, and means for then printing upon the wrapper on the wrapped book.

61. A machine of the character described having, in combination, mechanism for inserting articles in books, means for automatically feeding the books and contained articles to be wrapped, means for automatically feeding wrappers, means for placing wrappers about the books, and means for printing upon the wrappers on the wrapped books.

62. A machine of the character described having, in combination, mechanism for inserting articles in books, means for placing wrappers about the books and contained articles, means for feeding stencils into position adjacent to the wrapped articles, and means for printing through the stencils onto the wrappers on the wrapped articles.

63. A machine of the character described having, in combination, means for opening books and automatically inserting articles therein, means for wrapping and delivering said books and contained articles, means for printing on the wrappers on said books, said means including a plurality of stencils and mechanism for feeding said stencils and printing each stencil on one wrapper, and auxiliary means for periodically printing and delivering a tag, said tag printing and delivering means being automatically controlled by means of a special stencil of peculiar formation inserted at the end of a group of any desired number of stencils.

64. A machine of the character described having, in combination, a plurality of magazine stations, means associated with said stations for storing and intermittently delivering articles, said stations being spaced along a line inclined both to the vertical and horizontal, and inclined guide means adapted to deliver articles from said various stations at the lower end of said guide means.

65. A machine of the character described having, in combination, an inclined guideway, means for delivering a completely assembled book adjacent the lower end of said guideway, means for opening said book, and means for discharging a group of unassociated articles from said guideway into said open book.

66. A machine of the character described having, in combination, an inclined guideway, a plurality of magazine stations placed along said guideway, relatively flexible articles in certain of said stations, delivery means including suction grippers for intermittently delivering articles from said stations, relatively rigid articles in certain of other said stations, delivery means including pusher elements for intermittently delivering said relatively rigid articles, and means for synchronized actuation of all of said delivery means.

67. A machine of the character described having, in combination, a plurality of magazine stations, means for delivering articles of various kinds and sizes from said stations, and conveying means adapted to receive one or more articles from each station and deliver them in unassociated groups.

68. A machine of the character described having, in combination, an inclined guideway, means for intermittently delivering a closed book adjacent the lower end of said guideway, means for opening said book, and synchronized means for automatically dropping articles off the lower end of said guideway into said open book.

69. A machine of the character described having, in combination, an inclined guideway, a plurality of magazine stations spaced along said guideway, synchronized means for intermittently delivering articles from said stations to said guideway, and means comprising a plurality of spaced stop plates adapted to control the movement of said articles down said guideway.

70. A machine of the character described having, in combination, an inclined guideway, a plurality of magazine stations spaced along said guideway, means for intermittently delivering articles from said stations, a plurality of stop plates spaced along said guideway, and means for actuating said stop plates to collect one or more articles from each of said stations and deliver them in groups at the bottom of said guideway.

71. A machine of the character described having, in combination, means adapted to deliver articles of different kinds and sizes in unassociated groups, means for delivering books, and means for opening said books to receive said groups of articles.

72. A machine of the character described having, in combination, means for intermittently delivering books to a holding device, and automatic means for opening said books, said means comprising a knife, a spreading device adapted to lie close against the face of said knife while entering said book and subsequently to move laterally away from said knife to open said book.

73. A machine of the character described having, in combination, an inclined guideway, a plurality of magazine stations spaced along said guideway, means for delivering articles from said stations to allow them to slide down said guideway, and movable means controlling the motion of said articles down said guideway to assemble the same into groups.

74. A machine of the character described having, in combination, an inclined guideway, a plurality of magazine stations, means for intermittently delivering one or more articles from each of said stations to allow said articles to slide down said guideway, and movable means controlling the sliding of said articles down said guideway to assemble them into groups, each group containing one or more articles from each station.

75. A machine of the character described having, in combination, a conveyer, a plurality of magazine stations spaced along said conveyor, means for intermittently delivering articles from each station, means associated with each of a plurality of said stations adapted to move across the path of the articles in case of failure of said station to deliver articles and a single controlling means mechanically operable by any of said detecting means adapted upon failure of any of said stations to deliver an article to arrest the operation of the entire device.

76. A machine of the character described having, in combination, means for delivering completely assembled books, means for opening said books and inserting articles therein, means for folding a book, means for applying adhesive to a portion of a wrapper, means for subsequently associating said folded book with said wrapper and for placing said wrapper in operative position enclosing said book.

77. A machine of the character described having, in combination, a conveyor, a plurality of magazine stations spaced along said conveyor, feeding means for delivering articles of various kinds from said stations, means for delivering books adjacent the end of said conveyor, and for inserting groups of articles from said various stations in said books, means for conveying wrappers and associating them with said books, and a plurality of detecting means adapted to arrest the operation of the entire device upon failure of said book feeding means, certain of said article feeding means or said wrapper feeding means, to deliver a book, article or wrapper respectively; or upon delivery of more than one wrapper by said wrapper feeding means.

In testimony whereof, I have hereunto set my hand.

WILLIAM P. DUN LANY.